United States Patent
Agarwal

(10) Patent No.: US 10,848,098 B2
(45) Date of Patent: Nov. 24, 2020

(54) SMART ENERGY STORAGE SYSTEM

(71) Applicant: Sandeep Agarwal, Fremont, CA (US)

(72) Inventor: Sandeep Agarwal, Fremont, CA (US)

( * ) Notice: Subject to any disclaimer, the term of this patent is extended or adjusted under 35 U.S.C. 154(b) by 381 days.

(21) Appl. No.: 15/835,929

(22) Filed: Dec. 8, 2017

(65) Prior Publication Data

US 2018/0167028 A1    Jun. 14, 2018

Related U.S. Application Data

(60) Provisional application No. 62/432,660, filed on Dec. 11, 2016.

(51) Int. Cl.
*H02S 40/38* (2014.01)
*H02J 3/38* (2006.01)
(Continued)

(52) U.S. Cl.
CPC ......... *H02S 40/38* (2014.12); *H01M 10/4264* (2013.01); *H01M 10/441* (2013.01);
(Continued)

(58) Field of Classification Search
CPC . H02S 40/38; H01M 10/486; H01M 10/4264; H01M 10/441; H01M 10/48; H01M 2010/4271; H01M 2010/4278; H02M 3/1588; H02M 3/33584; H02J 7/0018; H02J 3/32; H02J 7/0019; H02J 3/46; H02J 3/382; H02J 3/003; H02J 2300/20; H02J 2300/22; H02J 3/388; H02J 3/40; H02J 3/42; H02J 3/44; H02J 3/466;
(Continued)

(56) References Cited

U.S. PATENT DOCUMENTS

| | | | |
|---|---|---|---|
| 6,304,059 B1 | 10/2001 | Chalasani et al. | |
| 7,456,521 B2 * | 11/2008 | Weidenheimer | H02J 1/00 307/71 |

(Continued)

FOREIGN PATENT DOCUMENTS

WO    2016050446 A1    4/2016

OTHER PUBLICATIONS

Chatzinikolaou et al., E., "Cell SoC Balancing Using a Cascaded Full-Bridge Multilevel Converter in Battery Energy Storage Systems," IEEE Transactions on Industrial Electronics, Sep. 9, 2016, vol. 63, pp. 1-9.

(Continued)

*Primary Examiner* — M Baye Diao
(74) *Attorney, Agent, or Firm* — Goldberg Segalla

(57) ABSTRACT

A multi-source energy storage system (ESS) includes a master controller and a plurality of ESSs. A first ESS includes an ESS controller and a plurality of micro-ESSs. A first micro-ESS includes a plurality of nano-ESSs, a micro-ESS controller, and a pulse width modulator. A first nano-ESS includes a plurality of cells, a plurality of cell balancing converters, a bidirectional DC-DC converter and a nano-ESS controller. The multi-source ESS operates in a charging mode and a discharging mode. The multi-source ESS is connected to one of a load, an electric grid or a micro-grid, and provides power thereto when it operates in the discharging mode. The multi-source ESS receives power when it operates in the charging mode.

23 Claims, 17 Drawing Sheets

(51) Int. Cl.
| | |
|---|---|
| *H02J 3/46* | (2006.01) |
| *H02M 3/335* | (2006.01) |
| *H02J 7/00* | (2006.01) |
| *H02J 3/32* | (2006.01) |
| *H02M 3/158* | (2006.01) |
| *H01M 10/48* | (2006.01) |
| *H01M 10/44* | (2006.01) |
| *H01M 10/42* | (2006.01) |
| *G06Q 50/06* | (2012.01) |
| *H02J 3/00* | (2006.01) |

(52) U.S. Cl.
CPC ......... *H01M 10/48* (2013.01); *H01M 10/486* (2013.01); *H02J 3/32* (2013.01); *H02J 3/382* (2013.01); *H02J 3/46* (2013.01); *H02J 7/0018* (2013.01); *H02J 7/0019* (2013.01); *H02M 3/1588* (2013.01); *H02M 3/33584* (2013.01); *G06Q 50/06* (2013.01); *H01M 2010/4271* (2013.01); *H01M 2010/4278* (2013.01); *H02J 3/003* (2020.01); *Y02B 70/10* (2013.01); *Y02T 10/70* (2013.01)

(58) Field of Classification Search
CPC ..... H02J 3/472; H02J 3/48; H02J 3/50; Y02T 10/7055; Y02B 70/1466; G06Q 50/06
USPC .......................................................... 320/101
See application file for complete search history.

(56) References Cited

U.S. PATENT DOCUMENTS

| | | | | |
|---|---|---|---|---|
| 7,948,207 | B2* | 5/2011 | Scheucher | B60L 53/305 |
| | | | | 320/104 |
| 8,242,739 | B2* | 8/2012 | Krauer | B60L 53/24 |
| | | | | 320/107 |
| 8,410,755 | B2 | 4/2013 | Chau | |
| 8,482,155 | B2 | 7/2013 | Choi et al. | |
| 8,685,554 | B2* | 4/2014 | Asakura | H01M 10/486 |
| | | | | 429/53 |
| 8,686,693 | B2 | 4/2014 | Bhowmik et al. | |
| 8,766,597 | B2 | 7/2014 | Nork et al. | |
| 9,013,066 | B2 | 4/2015 | Kojori et al. | |
| 9,042,141 | B2* | 5/2015 | Yu | H02J 3/32 |
| | | | | 363/95 |
| 9,048,669 | B2 | 6/2015 | Lim et al. | |
| 9,270,133 | B2 | 2/2016 | Brisebois | |
| 9,455,578 | B2 | 9/2016 | Kim et al. | |
| 9,487,090 | B2* | 11/2016 | Zhang | B60L 1/12 |
| 9,705,332 | B2 | 7/2017 | Oudalov et al. | |
| 9,847,654 | B2* | 12/2017 | Beaston | H02J 7/342 |
| 9,878,635 | B1* | 1/2018 | Khaligh | H02M 3/1582 |
| 10,424,945 | B2* | 9/2019 | Yoo | H02J 7/02 |
| 10,541,548 | B2* | 1/2020 | Kim | H02J 7/0068 |
| 2003/0007369 | A1 | 1/2003 | Gilbreth et al. | |
| 2010/0327806 | A1 | 12/2010 | Brisebois | |
| 2011/0014501 | A1* | 1/2011 | Scheucher | B60L 53/11 |
| | | | | 429/7 |
| 2012/0119746 | A1 | 5/2012 | Macris | |
| 2012/0248873 | A1 | 10/2012 | Oudalov et al. | |
| 2014/0042815 | A1 | 2/2014 | Maksimovic et al. | |
| 2014/0042974 | A1 | 2/2014 | Yang et al. | |
| 2014/0125284 | A1 | 5/2014 | Qahouq | |
| 2014/0239856 | A1* | 8/2014 | Inniss | B60L 7/16 |
| | | | | 318/139 |
| 2014/0292259 | A1 | 10/2014 | Kim et al. | |
| 2015/0258946 | A1* | 9/2015 | Namuduri | B60K 6/28 |
| | | | | 307/10.1 |
| 2015/0357940 | A1 | 12/2015 | Ilic et al. | |
| 2016/0190822 | A1 | 6/2016 | Lee et al. | |
| 2017/0338519 | A1* | 11/2017 | Junger | H02J 7/0029 |
| 2018/0167028 | A1* | 6/2018 | Agarwal | H02M 3/1588 |
| 2018/0241239 | A1* | 8/2018 | Frost | G06F 17/16 |

OTHER PUBLICATIONS

Bouchhima et al., N., "Active Model-Based balancing Strategy for Self-Reconfigurable Batteries", Journal of Power Sources, Aug. 2016, vol. 322, pp. 129-137.
Analog Devices, Inc, "CN0235—Fully Isolated Lithium Ion Battery Monitoring and Protection System," pp. 1-10. http://www.analog.com/en/design-center/reference-designs/hardware-reference-design/circuits-from-the-lab/CN0235.html#rd-sampleproducts.
McCurlie et al., L., "Simplified Control for Redistributive Balancing Systems Using Bidirectional Flyback Converters," IEEE Transportation Electrification Conference and Expo (ITEC), Jun. 14-15, 2015, Dearborn, MI, USA, pp. 1-6.
International Search Report of corresponding International Application No. PCT/US2017/065375, from the Korean Patent Office, dated Apr. 13, 2018, pp. 1-4.
M. Muneeb ur Rehman et al., "Modular Approach for Continuous Cell-Level Balancing to Improve Performance of Large Battery Packs", IEEE Energy Conversion Congress and Exposition, Pittsburgh, Pennsylvania, Sep. 14-18, 2014, pp. 1-10.
Atmel Corporation, "Atmel Battery Management, Atmel Li-Ion Battery Management Solution for Automotive and Industrial Applications", 2011, pp. 1-8.
Active-Semi, Inc, 5V/1.5A Backup Battery Pack Manager, Rev. 2, Apr. 14, 2015, pp. 1-23.
Linear Technology Corporation, "Addressable High Efficiency Bidirectional Multicell Battery Balancer", 2013, pp. 1-42.
Rui, Hu, "Battery Management System for Electric Vehicle Applications", Sep. 16, 2011, University of Windsor, Windsor, Ontario, Canada, pp. 1-97.
Linear Technology Corporation, "Multicell Battery Stack Monitor", Feb. 9, 2011, pp. 1-40.
W. MC, Caul, "Cell-Balancing Techniques: Theory and Implementation", Jun. 17, 2013, pp. 111-138.
Sihua Wen, "Cell Balancing Buys Extra Run Time and Battery Life", Analog Applications Journal, Mar. 19, 2009, pp. 1-8.
Intersil Americas LLC, "Multi-Cell Li-Ion Battery Manager," Datasheet ISL78600, Rev. 9.00, May 23, 2017 pp. 1-105.
Maxim Integrated, "5-Cell to 10-Cell Li+ Protector with Cell Balancing", 2010, pp. 1-16.

* cited by examiner

SMART ENERGY STORAGE SYSTEM

CROSS-RELATED APPLICATIONS

This application claims priority of U.S. Provisional Application Ser. No. 62/432,660, filed Dec. 11, 2016, the contents of which are incorporated herein by reference.

FIELD OF THE INVENTION

The present invention relates generally to energy storage systems, and more particularly, to a smart energy storage system for powering a load or an electric grid or a micro-grid.

BACKGROUND

Environmental impact of non-renewable energy sources such as coal, petroleum, natural gas, and the like has led to an increased popularity of electric vehicles and hybrid-electric vehicles among the general population. Further, renewable energy sources such as solar power, wind power, hydro-electric power, geothermal power, and the like are also gaining a strong foothold in the energy sector. Electric and hybrid-electric vehicles, wind power systems, electric grids, as well as solar power systems typically employ energy storage systems for storing energy for later consumption. The energy storage systems are also employed in devices such as household appliances, medical device, power tools, consumer electronics, and the like.

Typically, an energy storage system employed in the aforementioned devices includes battery packs that are connected in series, parallel, or a combination thereof. The battery packs further include cells that are connected in series, parallel, or a combination thereof. The cells are typically rechargeable cells that can be charged or discharged as opposed to a primary battery. Most commercially available energy storage systems include only one type of rechargeable cells. The cells in the battery packs may be configured for providing one of high energy density or high power density at a time. The cells that are configured for providing high energy density cells are lithium ion batteries, fuel cells, and the like. The cells that are configured for providing high power density may include super-capacitors. However, as the cells in the battery packs are not configured to provide high energy and high power density simultaneously, the cells cannot be used in applications that require the battery back to provide high energy and high power density simultaneously.

Typically, the battery packs in the energy storage system are managed by a battery management system (BMS). Typically, the BMS is located within the battery pack. The BMS ensures that cells are operated optimally and within their safe operating limits. The BMS monitors a plurality of operation parameters such as a cell current, a cell voltage, and a cell temperature of each of the cells in the battery packs. The BMS further estimates parameters such as a state-of-health (SOH), a state-of-charge (SOC), and the like of the cells of the battery pack. The BMS is typically unable to control operating currents of cells or measure operating limits of the cells in the battery pack. Hence, the BMS implements cell modelling techniques to determine the estimated parameters such as the SOC and the SOH. Typically, the estimated parameters that are generated by the cell modelling techniques are not accurate. The inaccurate estimated parameters further lead to sub-optimal utilization of the battery packs.

The battery pack is further connected to a power conversion circuit. In conventional energy storage systems, the power conversion circuit is connected external to the battery pack. The power conversion circuit may be one of a Direct Current (DC)-DC converter or a DC-Alternating Current (AC) inverter. The power conversion circuit receives a first voltage from the battery pack, and generates a second voltage as a DC or an AC voltage. The power conversion circuit is connected to at least one of a load, an electric grid, and a micro-grid. Since the power conversion circuit is not located inside the battery pack, the power conversion circuit does not control charging and discharging of each of the cells in the battery pack individually. This is disadvantageous as the power conversion circuit is unable to prevent sub-optimal utilization of the battery pack.

Typically, the cells in the battery pack degrade or become weak after continuous use due to the electrochemical processes occurring in the cells. Weakening of the cells leads to inability of the cells to generate power at specified ratings. Further, continuous usage of the cells may lead to mismatch between the cells in the battery pack. The weakest cell in the battery pack becomes a limiting cell in the battery pack, further degrading the ability of the battery pack to generate power at specified ratings. To restore the performance of the energy storage system, new battery packs and power conversion circuits need to be added to the energy storage system periodically. In most scenarios, the battery pack has to be completely replaced with a new battery pack after a specified level of battery pack degradation is reached, thus causing wastage of the cells. Further, replacing the battery packs causes a monetary loss to users of the energy storage system.

In light of the foregoing discussion, there is a need for an energy storage system that includes power conversion circuits that can control charging and discharging at a cell level, provides a flexible BMS that can accurately measure the SOH and SOC of cells, reduces the operational costs of the energy storage system, and overcomes the aforementioned disadvantages.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
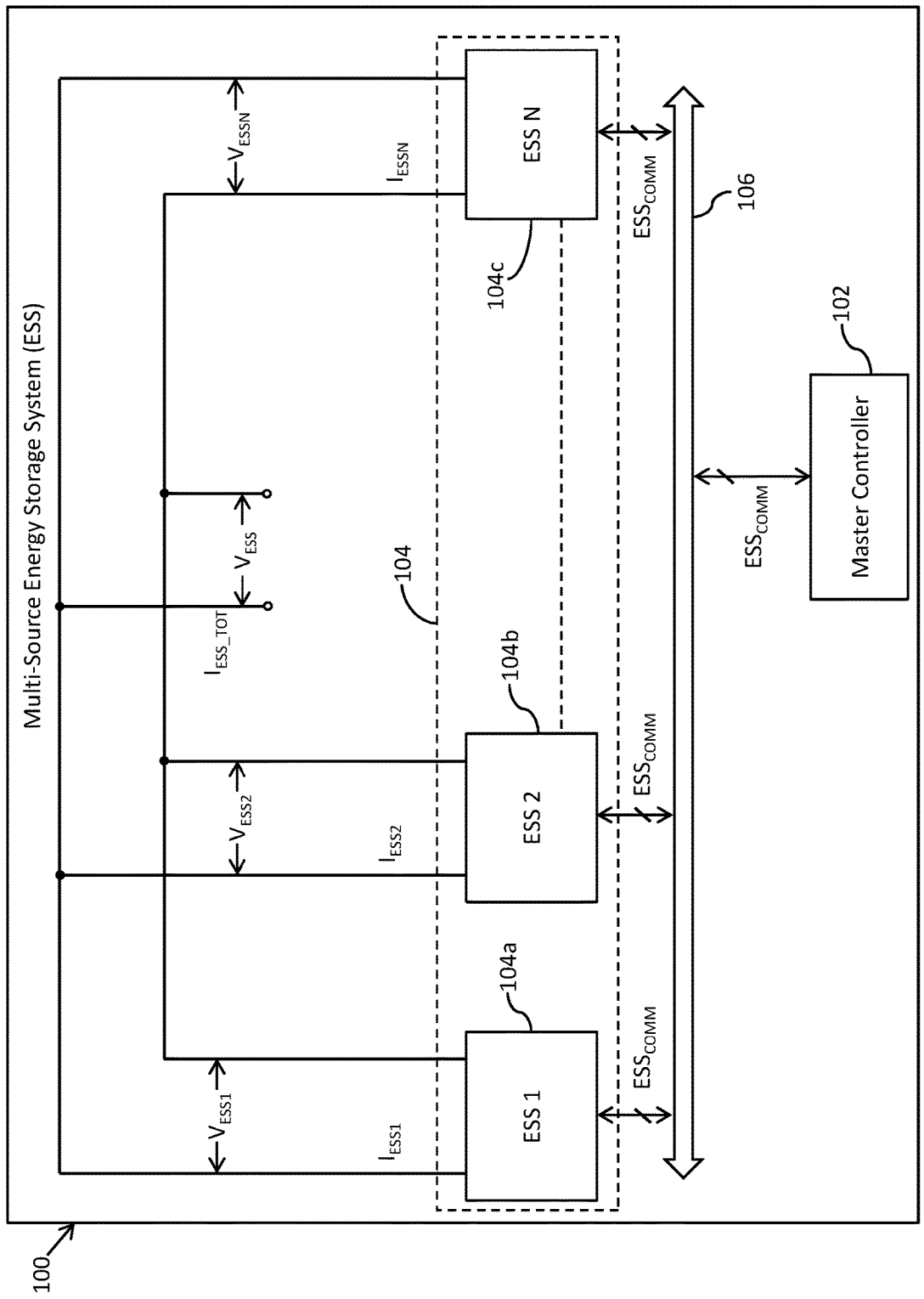
FIG. 1 is a schematic block diagram of a multi-source energy storage system (ESS) in accordance with an embodiment of the present invention.

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

In accordance with an embodiment of the present invention, an energy storage system (ESS) for generating an ESS voltage and an ESS current is provided. The ESS comprises a plurality of micro-ESSs that are connected in series. The plurality of micro-ESSs generate corresponding plurality of micro-ESS voltages. A first micro-ESS of the plurality of micro-ESSs generates a first micro-ESS voltage of the plurality of micro-ESS voltages and the ESS current. The ESS voltage is a sum of the plurality of micro-ESS voltages. The first micro-ESS comprises a plurality of nano-ESSs that generate corresponding plurality of nano-ESS voltages and currents. The plurality of nano-ESSs further generate an array total voltage and an array total current based on the plurality of nano-ESS voltages and currents, respectively. A first nano-ESS of the plurality of nano-ESSs comprises a plurality of cells that connected in series and generate corresponding plurality of cell voltages as an input voltage and corresponding plurality of cell currents as an input current. The first nano-ESS generates a first nano-ESS voltage and a first nano-ESS current based on the input voltage and the input current, respectively. The first micro-ESS generates the first micro-ESS voltage and the ESS current based on the array total voltage and the array total current.

In accordance with another embodiment of the present invention, a micro-energy storage system (ESS) is provided. The micro-ESS comprises a plurality of nano-ESSs, a micro-ESS controller, and a pulse width modulator (PWM). The plurality of nano-ESSs are connected in at least one of a series combination and a parallel combination. The plurality of nano-ESSs generate an array total voltage and an array total current. The micro-ESS controller is connected to the plurality of nano-ESSs and generates a nano-ESS synchronization-control signal by encoding a nano-ESS control signal with a nano-ESS synchronization signal, a plurality of nano-ESS communication signals, and a plurality of PWM control signals. The PWM is connected across the plurality of nano-ESSs and to the micro-ESS controller. The PWM receives the plurality of PWM control signals, the array total voltage, and the array total current, and generates a first micro-ESS voltage and a first micro-ESS current.

In accordance with yet another embodiment of the present invention, a method for determining a state-of-health (SOH) of a plurality of cells of an ESS is provided. The ESS includes a plurality of micro-ESSs. Each micro-ESS includes a plurality of nano-ESSs. The method includes selecting a first nano-ESS of the plurality nano-ESSs based on the micro-ESS synchronization-control signal by an ESS controller. The first nano-ESS includes the plurality of cells. The ESS controller determines a plurality of cell current values, a plurality of cell state-of-charge (SOC) values, a plurality of cell voltage values, and a plurality of cell capacity values corresponding to the plurality of cells. The ESS controller determines a plurality of cell impedance values corresponding to the plurality of cells. The ESS controller further determines a plurality of cell SOH values, values of maximum cell operating voltages, and values of minimum cell operating voltages corresponding to the plurality of cells. The plurality of cell SOH values represent the SOH of the plurality of cells. The ESS controller periodically updates values of the maximum and minimum cell operating voltages.

In accordance with yet another embodiment of the present invention, a method for estimating a plurality of charging rates and a plurality of discharging rates corresponding to a plurality of cells of an ESS is provided. The ESS includes a plurality of micro-ESSs. Each micro-ESS includes a plurality of nano-ESSs. The method includes determining a plurality of cell current values based on a plurality of balancing current values and a bidirectional DC-DC converter current value by a nano-ESS controller. The first nano-ESS includes the plurality of cells. The nano-ESS controller determines a plurality of state-of-charge (SOC) values corresponding to the plurality of cells based on the plurality of cell current values, the plurality of cell voltage values, and the plurality of cell temperature values. The nano-ESS controller receives an average SOC value from an ESS controller of the ESS. The average SOC value is an average of the plurality of SOC values. The ESS controller further determines a plurality of charge rates, and a plurality of discharge rates corresponding to the plurality of cells based on the plurality of SOC values.

Referring now to FIG. 1, a schematic block diagram of a multi-source energy storage system (ESS) 100 in accordance with an embodiment of the present invention is shown. The multi-source ESS 100 includes a master controller 102, an array of ESSs 104, out of which first through third ESSs 104a-104c are shown, and an ESS communication bus 106. The components and functioning of the first ESS 104a will be explained in conjunction with FIG. 2. The multi-source ESS 100 provides a desired power to at least one of an external load (not shown), an electric grid (not shown), and a micro-grid (not shown). In one scenario, a user of the multi-source ESS 100 may input a power requirement of the desired power to be supplied or drawn by the multi-source ESS 100. In an alternate scenario, the multi-source ESS 100 may automatically detect the power requirement of the desired power to be supplied or drawn by the multi-source ESS 100.

The master controller 102 controls the operation of the multi-source ESS 100. The master controller 102 may be made up of a Linux based computing system or a microcontroller based application board that may include multiple micro-controllers for controlling the operation of the multi-source ESS 100. The master controller 102 may further be connected to a computing system (not shown) for transmitting and receiving one or more control signals therefrom. The master controller 102 transmits and receives a set of ESS communication signals $ESS_{COMM}$ by way of the ESS communication bus 106. The first through third ESSs 104a-104c are connected in a parallel combination. The first through third ESSs 104a-104c are further connected to the master controller 102. The first through third ESSs 104a-104c receive the set of ESS communication signals $ESS_{COMM}$ by way of the ESS communication bus 106. The ESS communication bus 106 is a serial communication bus such as Modbus remote terminal unit (RTU) over RS-485, or controller area network (CAN) bus, and the like. The set of ESS communication signals $ESS_{COMM}$ is transmitted serially and is used for controlling the first through third ESSs 104a-104c.

The first ESS 104a receives the set of ESS communication signals $ESS_{COMM}$ as a first set of ESS communication signals from the master controller 102 by way of the ESS communication bus 106. Similarly, the second and third ESSs 104b and 104c receive the set of ESS communication signals $ESS_{COMM}$ as second and third sets of ESS communication signals, respectively, from the master controller 102 by way of the ESS communication bus 106. In one scenario, the master controller 102 may poll the first ESS 104a by way of the first set of ESS communication signals based on one or more bytes of the set of ESS communication signals $ESS_{COMM}$. After the first ESS 104a is polled based on the set of ESS communication signals $ESS_{COMM}$, the master controller 102 may further poll the second and third ESSs 104b and 104c by way of the second and third sets of communication signals, respectively, based on the one or more bytes of the set of ESS communication signals $ESS_{COMM}$. In another scenario, the master controller 102 may communicate with first through third ESSs 104a-104c simultaneously by sending a group command to the first through third ESSs 104a-104c.

The multi-source ESS 100 operates in a charging mode and a discharging mode. In the discharging mode, each of the first through third ESSs 104a-104c is discharged based on the first through third ESS communication signals, respectively. In one embodiment, the first through third ESSs 104a-104c generate first through third ESS currents $I_{ESS1}$-$I_{ESSN}$ for providing the desired power to one of an external load (not shown), an electric grid (not shown), and a micro-grid (not shown). The electric grid (not shown) and the micro-grid (not shown) receive the first through third ESS currents $I_{ESS1}$-$I_{ESSN}$ at the first through third ESS voltages $V_{ESS1}$-$V_{ESSN}$, respectively, from the multi-source ESS 100 as an ESS voltage $V_{ESS}$. In another embodiment, the first ESS 104a operates as a voltage source and generates the first ESS voltage $V_{ESS1}$. Further, the second and third ESSs 104b-104c operate as current sources and generate the second and third ESS currents $I_{ESS2}$ and $I_{ESSN}$, respectively, for providing the desired power to one of the external load (not shown), the electric grid (not shown), and the micro-grid (not shown). In yet another embodiment, the master controller 102 controls sharing of a total ESS current $I_{ESS\_TOT}$ of multi-source ESS 100 between the first through third ESSs 104a-104c. The master controller 102 periodically receives first through third ESS currents values $I\_VAL_{ESS1}$-$I\_VAL_{ESSN}$ that are values of the first through third ESS currents $I_{ESS1}$-$I_{ESSN}$. Based on the first through third communication signals, the master controller 102 determines an average of the first through third ESSs currents $I_{ESS1}$-$I_{ESSN}$ as an average ESS current to be discharged by the first through third ESSs 104a-104c. The average ESS current is given by equation (1):

$$\text{Average ESS current} = (I_{ESS1} + I_{ESS2} + \ldots + I_{ESSN})/N \qquad (1)$$

where N is a total number of ESSs in the array of ESSs 104. The second and third ESSs 104b and 104c discharge the second and third ESS currents $I_{ESS2}$ and $I_{ESSN}$, respectively, based on the average ESS current and the second and third ESS communication signals.

When the multi-source ESS 100 operates in the charging mode, the first through third ESSs 104a-104c are charged by way of a charging circuit (not shown) such as the electric grid (not shown), the micro-grid (not shown), a photovoltaic solar array (not shown), and the like. The charging circuit (not shown) may operate as one of a voltage source and a current source. The first through third ESSs 104a-104c draw the first through third ESS charging currents $I_{ESS1}$-$I_{ESSN}$ from the charging circuit (not shown) based on the first through third communication signals. The first through third ESSs 104a-104c are further charged to their respective capacities by way of the first through third ESS currents $I_{ESS1}$-$I_{ESSN}$.

Figure 2:
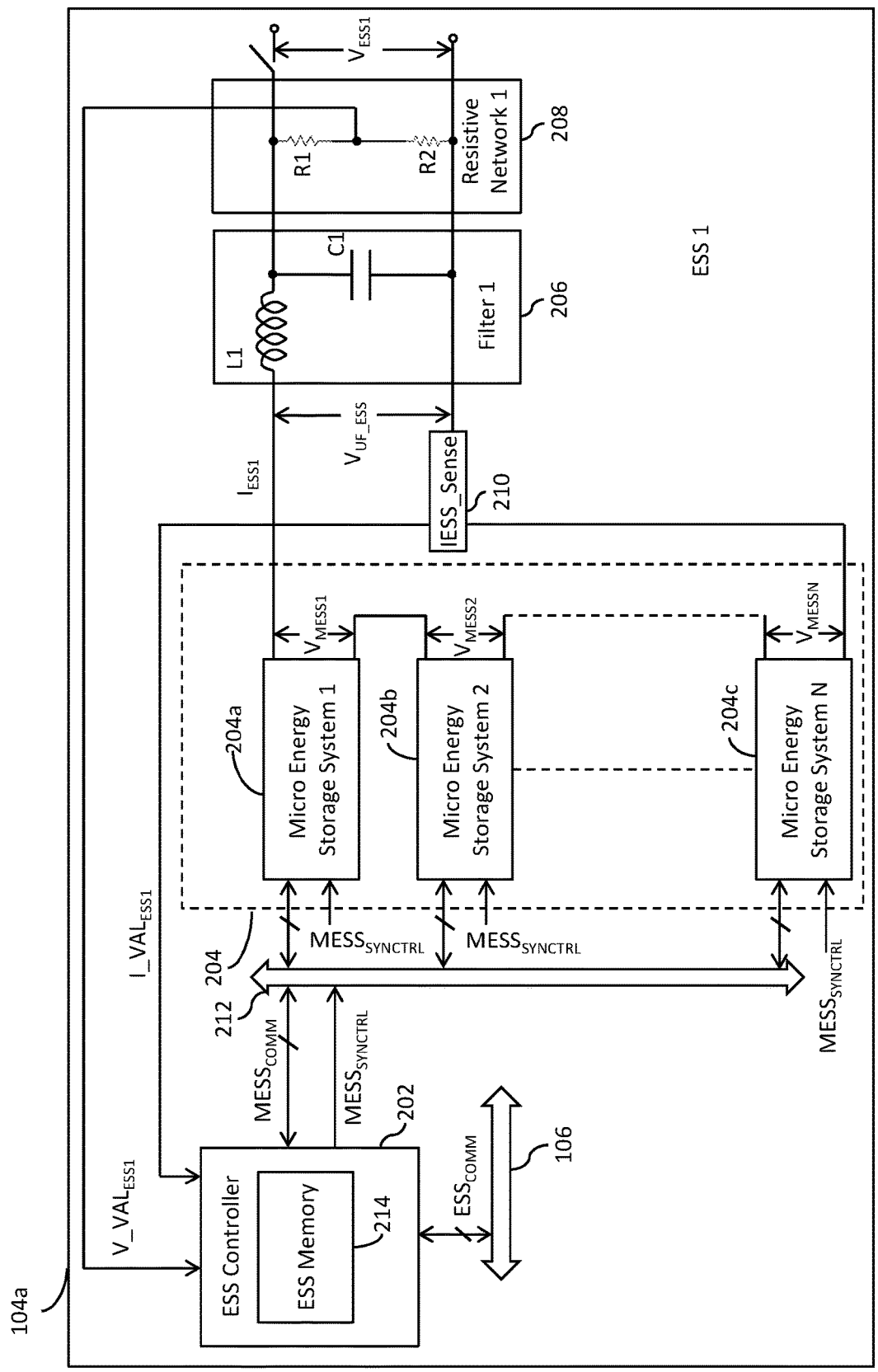
FIG. 2 is a schematic block diagram of a first ESS of the multi-source ESS of FIG. 1, in accordance with an embodiment of the present invention.

Referring now to FIG. 2, a schematic block diagram of the first ESS 104a in accordance with an embodiment of the present invention is shown. The first ESS 104a includes an ESS controller 202, an array of micro-ESSs 204, out of which first through third micro-ESSs 204a-204c are shown, a first filter 206, a first resistive network 208, a first current sensor 210, and a micro-ESS communication bus 212. Each micro-ESS is a small subset of the first ESS 104a. The ESS controller 202 may include a Linux based computing system or a micro-controller based application board that may include multiple micro-controllers for controlling the operation of the first ESS 104a. The ESS controller 202 includes an ESS memory 214 for storing multiple of operation parameters of the first ESS 104a. The ESS controller 202 is connected to the master controller 102 to receive the set of ESS communication signals $ESS_{COMM}$ as the first set of ESS communication signals by way of the ESS communication bus 106. The ESS controller 202 generates a multi-bit micro-ESS control signal $MESS_{CTRL}$ and a micro-ESS synchronization signal $F_{MESS\_SYNC}$, and encodes the multi-bit micro-ESS control signal $MESS_{CTRL}$ with the micro-ESS synchronization signal $F_{MESS\_SYNC}$. Based on the multi-bit micro-ESS control signal $MESS_{CTRL}$ and the micro-ESS synchronization signal $F_{MESS\_SYNC}$, the ESS controller 202 generates a micro-ESS synchronization-control signal $MESS_{SYNCTRL}$. The ESS controller 202 further generates a set micro-ESS communication signals $MESS_{COMM}$ based on the first set of ESS communication signals. The first through third micro-ESSs 204a-204c are connected in a series connection. The first through third micro-ESSs 204a-204c are connected to the master controller 102 and receive the micro-ESS synchronization-control signal $MESS_{SYNCTRL}$ therefrom. The first through third micro-ESSs 204a-204c are further connected to the ESS controller 202 by way of the micro-ESS communication bus 212. The first through third micro-ESSs 204a-204c receive the set of micro-ESS communication signals $MESS_{COMM}$ as the first through third sets of micro-ESS communication signals, respectively, by way of the micro-ESS communication bus 212. The components and functioning of the first micro-ESS 204a will be explained in conjunction with FIG. 4.

The first filter 206 is connected across the array of micro-ESSs 204. In an embodiment, the first filter 206 includes a first inductor L1 and a first capacitor C1.

The first resistive network 208 is connected across the first filter 206. In an embodiment, the first resistive network 208 includes first and second resistors R1 and R2. A first voltage sensor (not shown) is connected to a voltage tap of the first resistive network 208. The first voltage sensor (not shown) measures the first ESS $V_{ESS1}$ across the first and second resistors R1 and R2, and outputs a value of the first ESS voltage V_VAL$_{ESS1}$ to the ESS controller 202.

The first current sensor 210 is connected between the third micro-ESS 204c and the first filter 206. The first current sensor 210 measures the first ESS current $I_{ESS1}$ that flows through the first through third micro-ESSs 204a-204c and outputs a value of the ESS current I_VAL$_{ESS1}$ to the ESS controller 202 based on the ESS current $I_{ESS1}$.

When the multi-source ESS 100 operates in the discharging mode, the first through third micro-ESSs 204a-204c operate as one of a multi-level direct current (DC)-alternating current (AC) inverter, and a multi-level DC-DC converter based on the first through third micro-ESS communication signals, and the micro-ESS synchronization-control signal $MESS_{SYNCTRL}$. Each of the first through third micro-ESSs 204a-204c generate first through third micro-ESS voltages $V_{MESS1}$-$V_{MESSN}$, respectively, based on the micro-ESS synchronization-control signal $MESS_{SYNCTRL}$, and the first through third sets of micro-ESS communication signals, respectively. The first through third micro-ESS voltages $V_{MESS1}$-$V_{MESSN}$ have a first phase difference therebetween. The first through third micro-ESS voltages $V_{MESS1}$-$V_{MESSN}$ have the first phase difference therebetween to minimize switching noise and harmonic distortion in first ESS voltage $V_{ESS1}$. In one embodiment, the first ESS 104a operates as a voltage source. The ESS controller 202 compares the first ESS voltage $V_{ESS1}$ to a desired first ESS voltage. Based on the comparison, the ESS controller 202 generates a first error value that is a difference between the first ESS voltage $V_{ESS1}$ and the desired first ESS voltage. The ESS controller 202 further transmits the first error value to the first through third micro-ESSs 204a-204c. The first through third micro-ESSs 204a-204c increase or decrease the first through third micro-ESS voltages $V_{MESS1}$-$V_{MESSN}$, respectively, based on the first error value. The array of micro-ESSs 204 thus generates unfiltered ESS voltage $V_{UF\_ESS}$ based on the first through third micro-ESS voltages $V_{MESS1}$-$V_{MESSN}$, and further outputs the unfiltered ESS voltage $V_{UF\_ESS}$ to the first filter 206. The unfiltered ESS voltage $V_{UF\_ESS}$ is a sum of the first through third micro-ESS voltages $V_{MESS1}$-$V_{MESSN}$. The first filter 206 filters high frequency switching noise from the unfiltered ESS voltage $V_{UF\_ESS}$ and generates the first ESS voltage $V_{ESS1}$ which is given by equation (2):

$$V_{ESS1} = V_{MESS1} + V_{MESS2} + \ldots + V_{MESSN} \quad (2)$$

When the multi-source ESS 100 operates in the charging mode, the first filter 206 receives the first ESS voltage $V_{ESS1}$ from the charging circuit (not shown). The first filter 206 further outputs the first ESS voltage $V_{ESS1}$ to the array of micro-ESSs 204. The first through third micro-ESEs 204a-204c operate as one of a multi-level AC-DC pulse width modulator (PWM) rectifier, and a multi-level DC-DC converter when the multi-source ESS 100 operates in the charging mode. The first through third micro-ESSs 204a-204c receive first through third micro-ESS voltages $V_{MESS1}$-$V_{MESSN}$ based on the micro-ESS synchronization-control signal $MESS_{SYNCTRL}$, and the first through third set of micro-ESS communication signals, respectively. Each of the first through third micro-ESSs 204a-204c drains first through third micro-ESS currents (not shown), respectively, from the charging circuit (not shown). In one embodiment the ESS controller 202 compares the first ESS current $I_{ESS1}$ to a desired first ESS current. Based on the comparison, the ESS controller 202 generates a second error value that is a difference between the first ESS current $I_{ESS1}$ and the desired first ESS current. The ESS controller 202 further transmits the second error value to the first through third micro-ESSs 204a-204c. The first through third micro-ESSs 204a-204c increase or decrease the first through third micro-ESS charging currents (not shown), respectively, based on the second error value. The first through third micro-ESSs 204a-204c receive the first through third micro-ESS voltages $V_{MESS1}$-$V_{MESSN}$ based on the first through third sets of micro-ESS communication signals, and the micro-ESS synchronization-control signal $MESS_{SYNCTRL}$. The first through third micro-ESS voltages $V_{MESS1}$-$V_{MESSN}$ have the first phase difference therebetween to minimize switching noise and harmonic distortion in first ESS current $I_{ESS1}$. It will be apparent to a person skilled in the art that the second and third ESSs 104b and 104c are structurally and functionally similar to the first ESS 104a.

Figure 3:
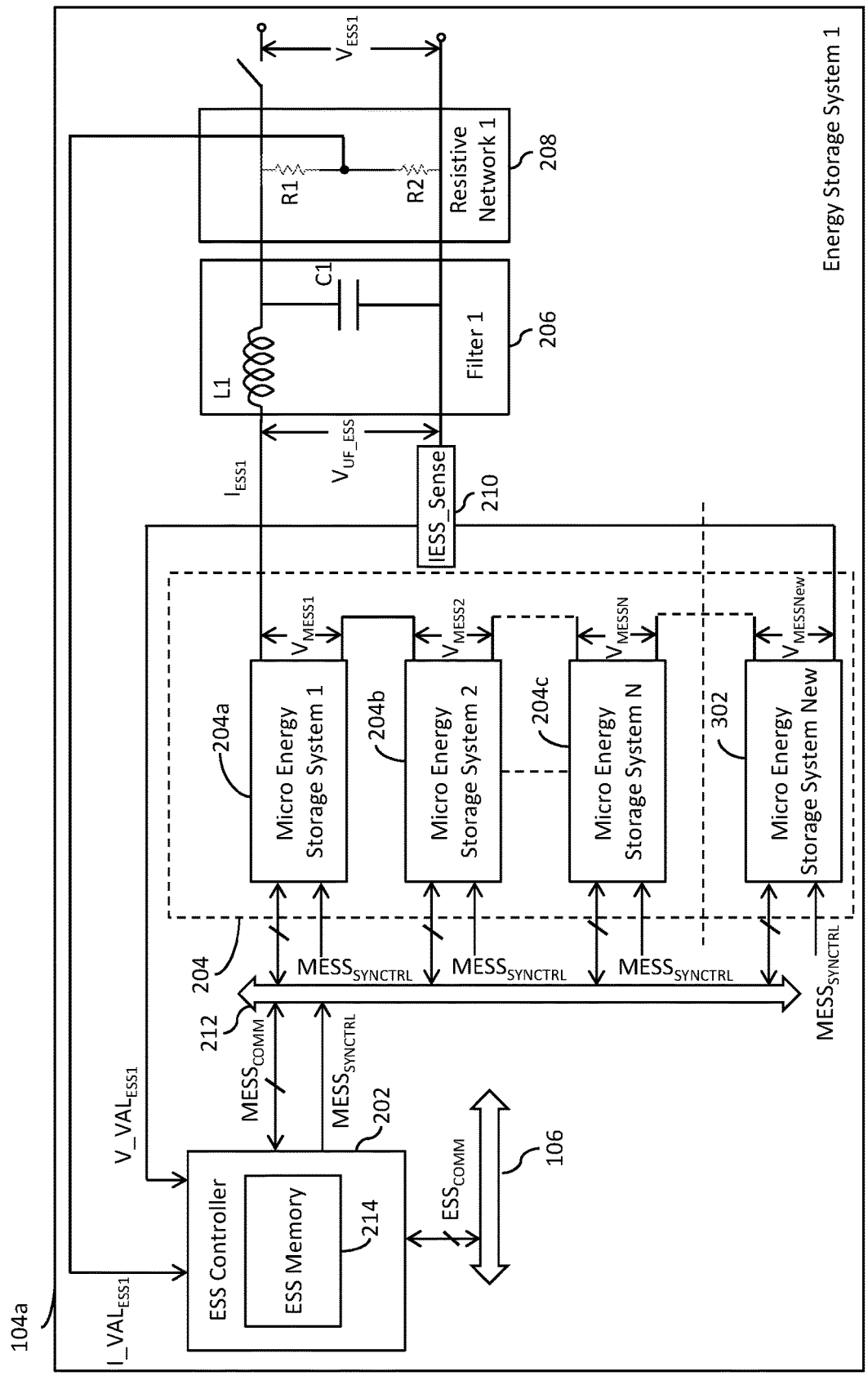
FIG. 3 is a schematic block diagram of the first ESS of the multi-source ESS of FIG. 1, in accordance with another embodiment of the present invention.

Referring now to FIG. 3, a schematic block diagram of the first ESS 104a in accordance with another embodiment of the present invention is shown. The first ESS 104a includes a new micro-ESS 302 that is connected in series with the array of micro-ESSs 204. The new micro-ESS 302 is further connected to the ESS controller 202. The ESS controller 202 detects a power rating of the new micro-ESS 302, and outputs the micro-ESS synchronization-control signal $MESS_{SYNCTRL}$ to the new micro-ESS 302. The ESS controller 202 further outputs the set of micro-ESS communication signals $MESS_{COMM}$ to the new micro-ESS 302 as a set of new micro-ESS communication signals. Hence, the first ESS voltage $V_{ESS1}$ is given by the equation (3):

$$V_{ESS1}=V_{MESS1}+V_{MESS2}+\ldots+V_{MESSN}+V_{MESSNew} \quad (3)$$

The ESS controller 202 further decreases a sum of the first through third micro-ESS voltages $V_{MESS1}$-$V_{MESSN}$ is by a voltage that is equal to the new micro-ESS voltage $V_{MESSNew}$. The ESS controller 202 further adjusts the first phase difference to minimize the switching noise and harmonic distortion in the first ESS voltage $V_{VESS1}$ and the first ESS current $I_{ESS1}$. It will be apparent to a person skilled in the art that the new micro-ESS 302 is structurally and functionally similar to the first through third micro-ESSs 204a-204c. The new micro-ESS 302 may be added in the first ESS 104a if any of the first through third micro-ESSs 204a-204c stops functioning optimally due to cell degradation. Further, the new micro-ESS 302 may be added to the first ESS 104a to augment power generation capacity of the multi-source ESS 100.

Figure 4:
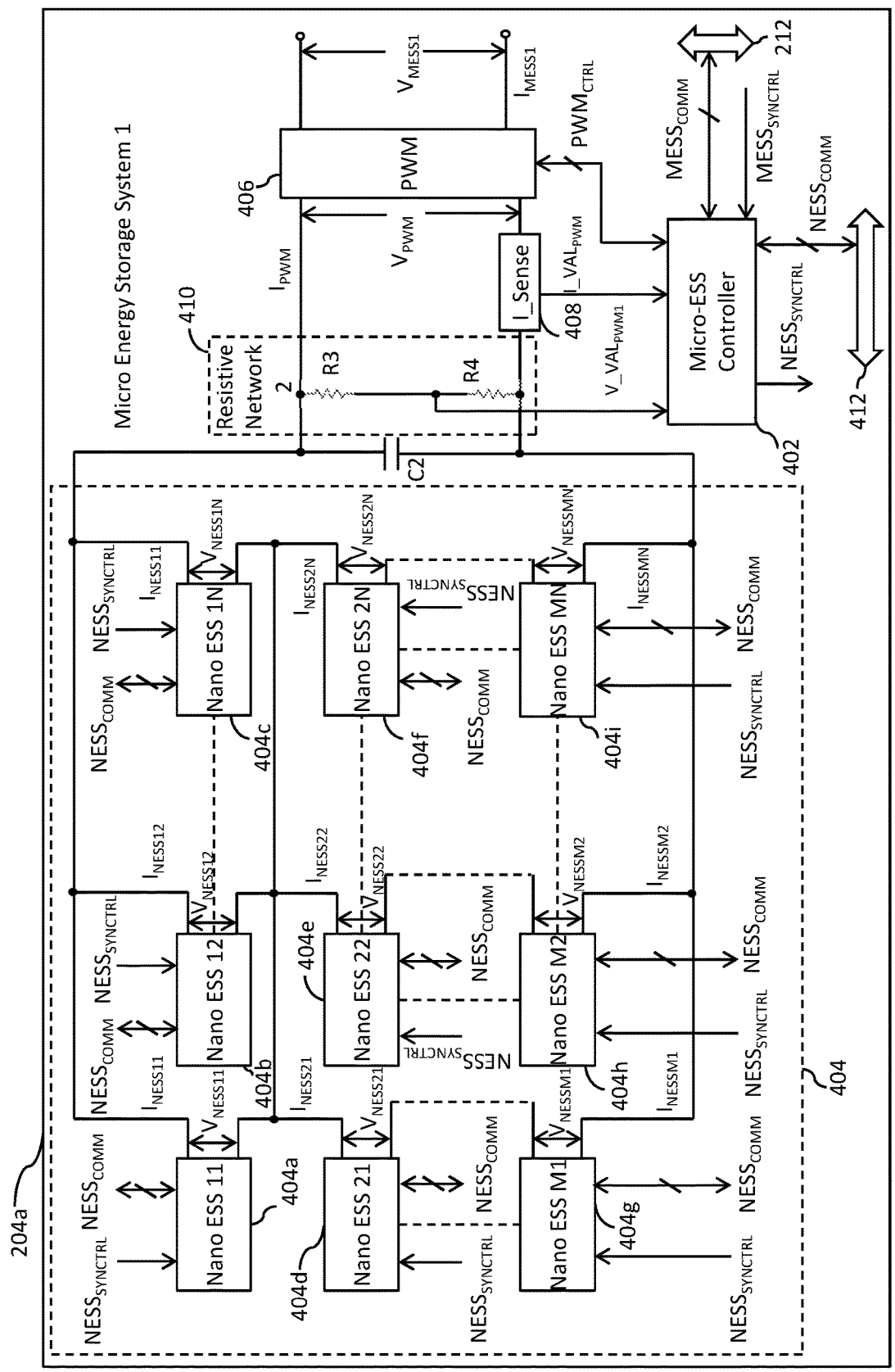
FIG. 4 is a schematic block diagram of a first micro-ESS of the first ESS of FIG. 2, wherein a micro-ESS (such as the first micro-ESS) is defined as a small subset of an ESS (such as the first ESS) and hereinafter is referred to as a micro-ESS, in accordance with an embodiment of the present invention.

Referring now to FIG. 4, a schematic block diagram of the first micro-ESS 204a in accordance with an embodiment of the present invention is shown. The first micro-ESS 204a includes a micro-ESS controller 402, an array of nano-ESSs 404 of which first through ninth nano-ESSs 404a-404i are shown, a pulse width modulator (PWM) 406, a second current sensor 408, a second capacitor C2, a second resistive network 410, and a nano-ESS communication bus 412. Each nano-ESS is a small subset of the first micro-ESS 204a. The micro-ESS controller 402 may comprise micro-controller based application board that may include multiple microcontrollers for controlling the operation of the first micro-ESS 204a. The micro-ESS controller 402 controls the operation of the first micro-ESS 204a in conjunction with the ESS controller 202 and the master controller 102. The micro-ESS controller 402 is connected to the ESS controller 202 to receive the set of micro-ESS communication signals $MESS_{COMM}$ as the first set of micro-ESS communication signals, and the micro-ESS synchronization-control signal $MESS_{SYNCTRL}$. The micro-ESS controller 402 generates a nano-ESS synchronization-control signal $NESS_{SYNCTRL}$, a set of nano-ESS communication signals $NESS_{COMM}$, and a set of PWM control signals $PWM_{CTRL}$. The micro-ESS controller encodes a multi-bit nano-ESS control signal $NESS_{CTRL}$ with the nano-ESS synchronization signal $F_{NESS\_SYNC}$, and generates the nano-ESS synchronization-control signal $NESS_{SYNCTRL}$. The first nano-ESS 404a is connected to the micro-ESS controller 402, and receives the nano-ESS synchronization-control signal $NESS_{SYNCTRL}$, and the set of nano-ESS communication signals $NESS_{COMM}$ as a first set of nano-ESS communication signals by way of the nano-ESS communication bus 412. Similarly, each of the second through ninth nano-ESSs 404b-404i receives the nano-ESS synchronization signal $NESS_{SYNCTRL}$ from the micro-ESS controller 402. Further, the second through ninth nano-ESSs 404b-404i receive the set of nano-ESS communication signals $NESS_{COMM}$ as second through ninth nano-ESS communication signals, respectively, by way of the nano-ESS communication bus 412.

The PWM 406 is connected across the array of nano-ESSs 404. The PWM 406 is further connected to the micro-ESS controller 402 and receives the set of PWM control signals $PWM_{CTRL}$ therefrom. The PWM 406 has a first switching frequency $F_{PWM}$ with a first phase shift $PH_{MESS1}$ with respect to the nano-ESS synchronization signal $F_{NESS\_SYNC}$. The components and functioning of the PWM 406 will be explained in conjunction with FIGS. 6 and 7. In one embodiment, the PWM 406 receives the set of PWM control signals $PWM_{CTRL}$ as first through fourth PWM control signals $PWM_{CTRL1}$-$PWM_{CTRL4}$. In another embodiment, the PWM 406 receives the set of PWM control signals $PWM_{CTRL}$ as fifth and sixth PWM control signals $PWM_{CTRL5}$ and $PWM_{CTRL6}$.

The second capacitor C2 is connected across input terminals of the PWM 406. A second resistive network 410 is further connected across input terminals of the PWM 406. In one embodiment, the second resistive network 410 includes third and fourth resistors R3 and R4.

The second current sensor 408 is connected between the sixth through ninth nano-ESS 404g-404i and the PWM 406. The second current sensor 408 measures an array total current $I_{PWM}$ that flows through the array of nano-ESSs 404. The second current sensor 408 outputs a value of the array total current $I\_VAL_{PWM}$ to the micro-ESS controller 402 based on the array total current $I_{PWM}$.

When the multi-source ESS 100 operates in the charging mode, the first through ninth nano-ESSs 404a-404i draw first through ninth nano-ESS currents $I_{NESS11}$-$I_{NESSMN}$ based on the first through ninth sets of nano-ESS communication signals, respectively, and the nano-ESS synchronization-control signal $NESS_{SYNCTRL}$. The array of nano-ESSs 404 receives the array total current $I_{PWM}$ based on first through ninth nano-ESS currents $I_{NESS11}$-$I_{NESSMN}$. In this scenario, the array total voltage $V_{PWM}$ and an array total current $I_{PWM}$ are given by the equations (4)-(8):

$$I_{PWM}=I_{NESS11}+I_{NESS12}+\ldots+I_{NESS1N}=I_{NESS21}+I_{NESS22}+\ldots+I_{NESS2N}=I_{NESSM1}+I_{NESSM2}+\ldots+I_{NESSMN} \quad (4)$$

$$V_{PWM}=V_{NESS11}+V_{NESS21}+V_{NESS31} \quad (5)$$

$$V_{NESS11}=V_{NESS12}=V_{NESS1M} \quad (6)$$

$$V_{NESS21}=V_{NESS22}=V_{NESS2M} \quad (7)$$

$$V_{NESSN1}=V_{NESSN2}=V_{NESSNM} \quad (8)$$

The first through ninth nano-ESS voltages $V_{NESS11}$-$V_{NESSMN}$ have a second phase difference therebetween to minimize switching noise in the array total voltage $V_{PWM}$ and total array current $I_{PWM}$. When the multi-source ESS 100 operates in the charging mode, the PWM 406 receives the first micro-ESS voltage $V_{MESS1}$ from the charging circuit (not shown). The PWM 406 further outputs the array total voltage $V_{PWM}$ to the array of nano-ESSs 404. The first through ninth nano-ESSs 404a-404i receive the first through ninth nano-ESS voltages $V_{NESS11}$-$V_{NESSMN}$ from the PWM 406. The micro-ESS controller 402 transmits a third error value that is a difference a desired array total current and the array total current $I_{PWM}$ to the first through ninth nano-ESSs 404a-404i. The first through ninth nano-ESSs 404a-404i increase or decrease the first through ninth nano-ESS currents $I_{NESS11}$-$I_{NESSMN}$ based on the third error value.

When the multi-source ESS 100 operates in the discharging mode, the multi-source ESS 100 may operate as one of a voltage source and a current source. When the multi-source ESS 100 operates like a voltage source, the first ESS 104a generates the first ESS voltage $V_{ESSS1}$ as a sum of the first through third micro-ESS voltages $V_{MESS1}$-$V_{MESSN}$. Further, each of the first through third micro-ESSs 204a-204c operates as a voltage source for generating the first through third micro-ESS voltages $V_{MESS1}$-$V_{MESSN}$, respectively. Since, the first through third nano-ESSs 404a-404c, the fourth through sixth nano-ESSs 404d-404f, and the seventh through ninth nano-ESSs 404g-404i are each connected in a parallel combination, all of the first through ninth nano-ESS 404a-404i do not operate as a voltage source. In one embodiment, the first nano-ESS 404a, the fourth nano-ESS 404d, and the seventh nano-ESS 404g operate as voltage sources. Further, the second and third nano-ESSs 404b and 404c operate as current sources in parallel with the first nano-ESS 404a. The fifth and sixth nano-ESSs 404e and 404f operate as current sources in parallel with the fourth nano-ESS 404d. Similarly, the eighth and ninth nano-ESSs 404h and 404i operate as current sources in parallel with the seventh nano-ESS 404g. In another embodiment each of the first through ninth nano-ESSs 404a-404i operates as current a source. The first through ninth nano-ESSs 404a-404i further generate the first through ninth nano-ESS currents $I_{NESS11}$-$I_{NESSMN}$ based on the first through ninth sets of nano-ESS communication signals, respectively, and the nano-ESS synchronization-control signal $NESS_{SYNCTRL}$. The array of nano-ESSs 404 further generates the array total current $I_{PWM}$ based on the first through ninth nano-ESS currents $I_{NESS11}$-$I_{NESSMN}$. The array of nano-ESSs 404 further supplies the array total current $I_{PWM}$ to the second capacitor C2. The micro-ESS controller 402 further stabilizes the array total voltage $V_{PWM}$ by based on a difference between the array total voltage $V_{PWM}$ and the first ESS current $I_{ESS1}$.

Figure 5:
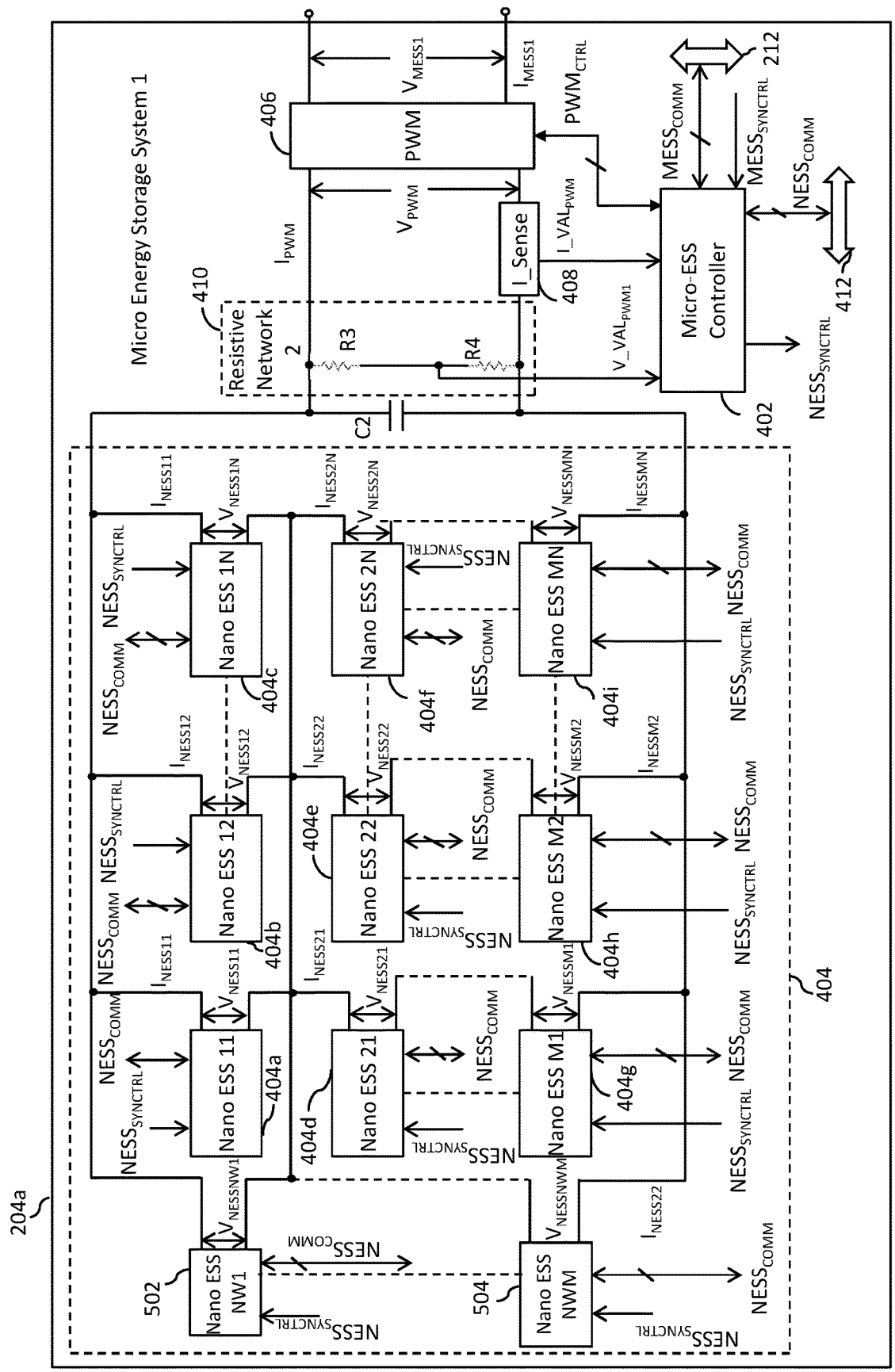
FIG. 5 is a schematic block diagram of the first micro-ESS of the first ESS of FIG. 2, in accordance with another embodiment of the present invention.

Referring now to FIG. 5, the first micro-ESS 204a in accordance with another embodiment of the present invention is shown. The first micro-ESS 204a includes first and second new nano-ESSs 502 and 504 that are connected in parallel with the array of nano-ESSs 404. The micro-ESS controller 402 automatically detects power ratings of the first and second new nano-ESSs 502 and 504, and outputs the set of nano-ESS communication signals $NESS_{COMM}$ to the first and second new nano-ESSs 502 and 504, as first and second sets of new nano-ESS communication signals. The micro-ESS controller 402 further outputs the nano-ESS synchronization-control signal $NESS_{SYNCTRL}$ to the first and second new nano-ESSs 502 and 504 by way of the nano-ESS communication bus 412. The first and second new nano-ESSs 502 and 504 are structurally and functionally similar to the first through ninth nano-ESSs 404a-404i. The first and second new nano-ESSs 502 and 504 generate first and second new nano-ESS currents $I_{NESSNW1}$ and $I_{NESSNWM}$, and first and second new nano-ESS voltages $V_{NESSNW1}$ and $V_{NESSNWM}$ based on the first and second sets of new nano-ESS communication signals, respectively, and the nano-ESS synchronization-control signal $NESS_{SYNCTRL}$. Hence, the array total voltage $V_{PWM}$ and array total current $I_{PWM}$ are given by the equations (9)-(13):

$$I_{PWM} = I_{NESS11} + I_{NESS12} + \ldots + I_{NESS1N} + I_{NESSNW1} = I_{NESS21} + I_{NESS22} + \ldots + I_{NESS2N} = I_{NESSM1} + I_{NESSM2} + \ldots + I_{NESSMN} + I_{NESSMNWM}$$ (9)

$$V_{PWM} = V_{NESS11} + V_{NESS21} + V_{NESS31}$$ (10)

$$V_{NESS11} = V_{NESS12} = V_{NESS1M} = V_{NESSNW1}$$ (11)

$$V_{NESS21} = V_{NESS22} = V_{NESS2M} = V_{NESSNW2}$$ (12)

$$V_{NESSN1} = V_{NESSN2} = V_{NESSNM} = V_{NESSNM}$$ (13)

When the first new nano-ESS 502 is added in parallel to the array of nano-ESSs 404, the micro-ESS controller 402 decreases a sum of the first through third nano-ESS currents $I_{NESS11}$-$I_{NESS1N}$ by a current that is equal to the first new nano-ESS current $I_{NESSNW1}$. Hence, a sum of the first through third nano-ESS currents $I_{NESS11}$-$I_{NESS1N}$ and the new nano-ESS current $I_{NESSNW1}$ is equal to the array total current $I_{PWM}$. The micro-ESS controller further adjusts the second phase difference to minimize the switching noise and harmonic distortion in the array total voltage $V_{PWM}$ and the array total current $I_{PWM}$. It will further be apparent to a person skilled in the art that the second new nano-ESS 504 in a similar manner as that of the first new nano-ESS 502. The first and second new nano-ESSs 502 and 504 may be added in the first micro-ESS 204a if any of the first through ninth nano-ESSs 404a-404i stops functioning optimally due to cell degradation. Further, the first and second new nano-ESSs 502 and 504 may be added to the first micro-ESS 204a to augment power generation capacity of the multi-source ESS 100.

Figure 6:
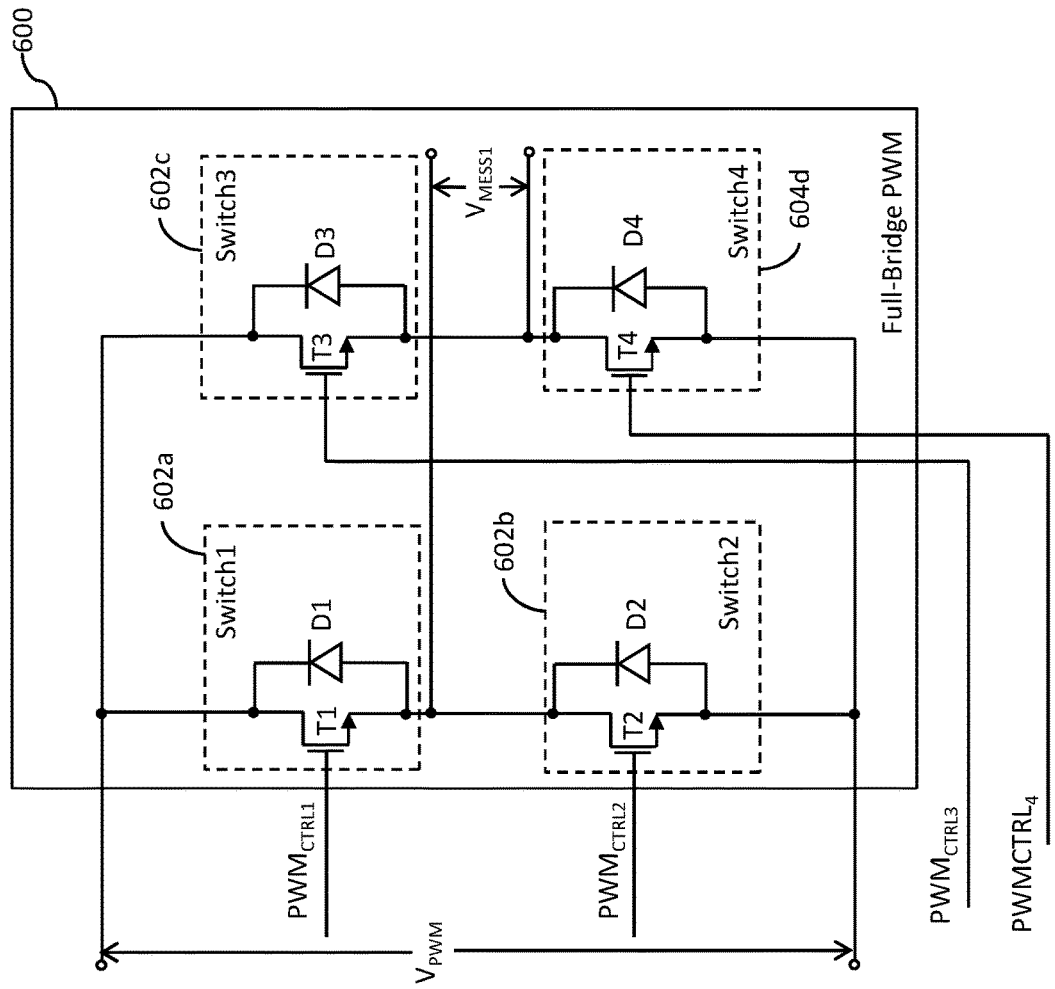
FIG. 6 is a circuit diagram of a full-bridge pulse width modulator (PWM) of the first micro-ESS of FIG. 4, in accordance with an embodiment of the present invention.

Referring now to FIG. 6, a circuit diagram the PWM 406 that operates as a full-bridge PWM 600 in accordance with an embodiment of the present invention is shown. The full-bridge PWM 600 includes first through fourth switches 602a-604d. In an embodiment, the first switch 602a includes a first transistor T1 and a first diode D1. The second switch 602b includes a second transistor T2 and a second diode D2. The third switch 602c includes a third transistor T3 and a third diode D3. The fourth switch 604d includes a fourth transistor T4 and a fourth diode D4. The first switch 602a is connected between a first input terminal of the full-bridge PWM 600 and a first output terminal of the full-bridge PWM 600. The second switch 602b is connected between a second input terminal of the full-bridge PWM 600 and the first output terminal of the full-bridge PWM 600. The third switch 602c is connected between the first input terminal of the full-bridge PWM 600 and a second output terminal of the full-bridge PWM 600. The fourth switch 604d is connected between the second input terminal of the full-bridge PWM 600 and the second output terminal of the full-bridge PWM 600.

A cathode terminal of the first diode D1 is connected to a drain terminal of the first transistor T1. An anode terminal of the first diode D1 is connected to a source terminal of the first transistor T1. A gate terminal of the first transistor T1 is connected to the micro-ESS controller 402 for receiving the first PWM control signal $PWM_{CTRL1}$. It will be apparent to a person skilled in the art that the second through fourth diodes D2-D4 are connected to the second through fourth transistors T2-T4, respectively, in a manner similar to the first diode D1 and the first transistor T1. It will further be apparent to a person skilled in the art that gates of the second through fourth transistors T2-T4 receive the second through fourth PWM control signals $PWM_{CTRL2}$-$PWM_{CTRL4}$, respectively, from the micro-ESS controller 402.

The micro-ESS controller 402 controls switching of the first through fourth switches 602a-604d based on the first through fourth PWM control signals $PWM_{CTRL1}$-$PWM_{CTRL4}$, respectively. The first and second input terminals of the full-bridge PWM 600 are connected to the array of nano-ESSs 404 for receiving the array total voltage $V_{PWM}$. The full-bridge PWM 600 generates the first micro-ESS voltage $V_{MESS1}$ as one of a DC pulse width modulated voltage, a rectified sinusoidal pulse width modulated voltage, a sinusoidal pulse width modulated voltage, and an un-modulated DC voltage based on the first through fourth PWM control signals $PWM_{CTRL1}$-$PWM_{CTRL4}$.

Figure 7:
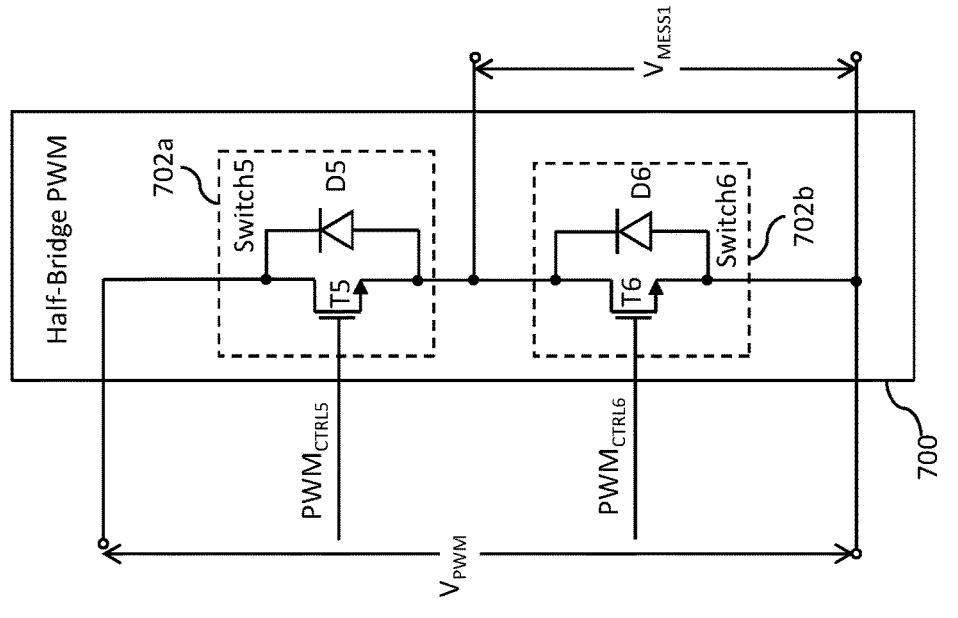
FIG. 7 is a circuit diagram of a half-bridge PWM of the first micro-ESS of FIG. 4, in accordance with an embodiment of the present invention.

Referring now to FIG. 7, a circuit diagram of the PWM 406 that operates as a half-bridge PWM 700 in accordance with another embodiment of the present invention is shown. The half-bridge PWM 700 includes fifth and sixth switches 702a and 702b. The fifth switch 702a includes a fifth transistor T5 and a fifth diode D5. The sixth switch 702b includes a sixth transistor T6 and a sixth diode D6. It will be apparent to a person skilled in the art that the fifth and sixth diodes D5 and D6 are connected to the fifth and sixth transistors T5 and T6, respectively, in a manner similar to the first diode D1 and the first transistor T1 of the first switch 602. Gate terminals of the fifth and sixth transistors T5 and T6 receive the fifth and sixth PWM control signals $PWM_{CTRL5}$ and $PWM_{CTRL6}$, respectively, from the micro-ESS controller 402.

The fifth switch 702a is connected between a first input terminal of the half-bridge PWM 700 and a first output terminal of the half-bridge PWM 700. The sixth switch 702b is connected between the first output terminal of the half-bridge PWM 700 and a second input terminal of the half-bridge PWM 700. The first and second input terminals of the half-bridge PWM 700 are connected to the array of nano-ESSs 404 for receiving the array total voltage $V_{PWM}$. The half-bridge PWM 700 hence generates the first micro-ESS voltage $V_{ESS1}$ as one of a DC pulse width modulated voltage, a rectified sinusoidal pulse width modulated voltage, and an un-modulated DC voltage based on the fifth and sixth PWM control signals $PWM_{CTRL5}$ and $PWM_{CTRL6}$.

Figure 8:
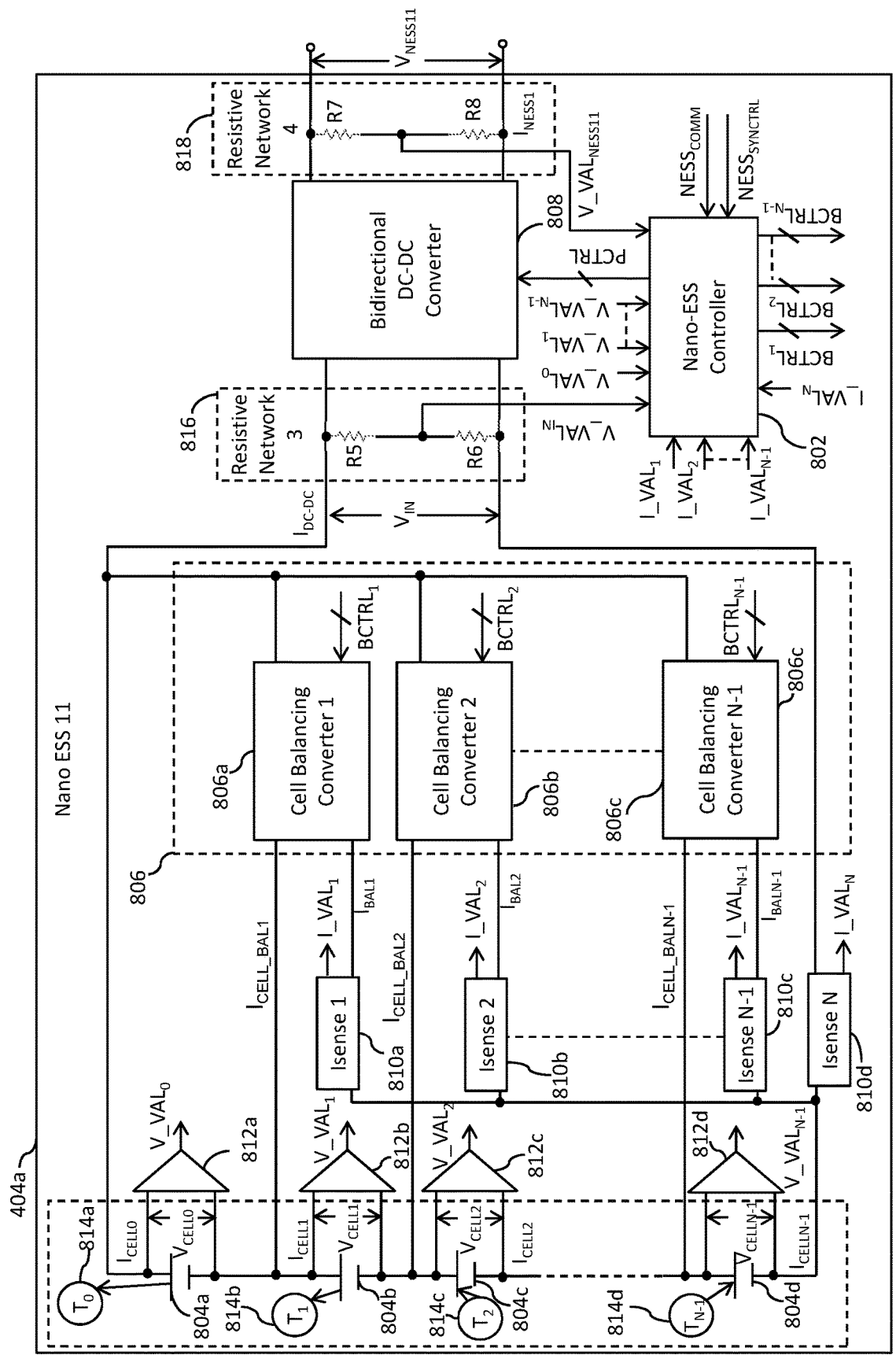
FIG. 8 is a schematic block diagram of a first nano-ESS of the first micro-ESS of FIG. 4, wherein a nano-ESS (such as the first nano-ESS) is defined as a small subset of a micro-ESS (such as the first micro-ESS) and hereinafter is referred to as a nano-ESS, in accordance with an embodiment of the present invention.

Referring now to FIG. 8, a schematic block diagram of the first nano-ESS 404a in accordance with an embodiment of the present invention is shown. The first nano-ESS 404a includes a nano-ESS controller 802, an array of cells 804 connected in a series combination, of which first through fourth cells 804a-804d are shown, an array of cell balancing converters 806, of which first through third cell balancing converters 806a-806c are shown, a bidirectional DC-DC converter 808, an array of current sensors 810, of which third through sixth current sensors 810a-810d are shown, an array of voltage sensors 812, of which second through fifth voltage sensors 812a-812d are shown, first through fourth temperature sensors 814a-814d, and third and fourth resistive networks 816 and 818. The nano-ESS controller 802 may comprise a micro-controller based application board that may include multiple micro-controllers for controlling the operation of the first nano-ESS 404a. The nano-ESS controller 802 is connected to the micro-ESS controller 402, the first through third cell balancing converters 806a-806c, the bidirectional DC-DC converter 808, the third through sixth current sensors 810a-810d, the second through fifth voltage sensors 812a-812d, and the third and fourth resistive networks 816 and 818. The nano-ESS controller 802 is connected to the micro-ESS controller 402 to receive the set of nano-ESS communication signals $NESS_{COMM}$ as the first set of nano-ESS communication signals by way of the nano-ESS communication bus 412, and the nano-ESS synchronization-control signal $NESS_{SYNCTRL}$.

The nano-ESS controller 802 generates multiple balancing control signals, of which first through third sets of balancing control signals $BCTRL_1$-$BCTRL_{N-1}$ are shown, and a set of power control signals PCTRL based on the first set of nano-ESS communication signals and the nano-ESS synchronization-control signal $NESS_{SYNCTRL}$. The first through fourth cells 804a-804d are rechargeable electrochemical cells such as battery cells, ultra capacitors, fuel cells, and the like. The first through fourth cells 804a-804d generate first through fourth cell voltages $V_{CELL0}$-$V_{CELLN-1}$, respectively. Further, first through fourth cell currents $I_{CELL0}$-$I_{CELLN-1}$ flow through the first through fourth cells 804a-804d, respectively. In one embodiment, each of the first through fourth cells 804a-804d includes multiple cells that are connected in a parallel connection.

The first cell balancing converter 806a has a first input terminal connected to a positive terminal of the second cell 804b. A second input terminal of the first cell balancing converter 806a is connected to a negative terminal of the fourth cell 804d. The first cell balancing converter 806a is connected to the nano-ESS controller 802 and receives the first set of balancing control signals $BCTRL_1$ therefrom. The first cell balancing converter 806a generates a first balancing current $I_{BAL1}$ based on a mismatch in a first state-of-charge (SOC) of the first cell 804b, and second, third, and fourth SOCs of the second, third, and fourth cells 804a, 804c, and 804d, respectively, and the first set of cell balancing control signals $BCTRL_1$. The second and third cell balancing converters 806b and 806c are structurally and functionally similar to the first cell balancing converter 806a. The second and third cell balancing converters 806b and 806c generate second and third balancing currents $I_{BAL2}$ and $I_{BALN-1}$ in a similar manner as that of the first cell balancing converter 806a.

The bidirectional DC-DC converter 808 is connected to the nano-ESS controller 802 and receives the set of power control signals PCTRL therefrom. The bidirectional DC-DC converter 808 further generates a bidirectional DC-DC converter current $I_{DC-DC}$ and the first nano-ESS voltage $V_{NESS11}$ based on the set of power control signals PCTRL. The array of cell balancing converters 806 and the bidirectional DC-DC converter 808 perform balancing of a charge rate and a discharge rate of each of the first through fourth cells 804a-804d through the first through fourth cell currents $I_{CELL0}$-$I_{CELLN-1}$ based on the first through third balancing currents $I_{BAL1}$-$I_{BALN-1}$, respectively. In one embodiment the nano-ESS controller 802 further controls a minimum operating voltage and a maximum operating voltage of each of the first through fourth cells 804a-804d based on the first through third balancing currents $I_{BAL1}$-$I_{BALN-1}$, respectively, and the bidirectional DC-DC converter current $I_{DC-DC}$. In an embodiment the first through fourth cell currents $I_{CELL0}$-$I_{CELLN-1}$ are generated based on first through third cell balancing currents $I_{CELL\_BAL1}$-$I_{CELL\_BALN-1}$. The first through fourth cell currents $I_{CELL0}$-$I_{CELLN-1}$ are given by the equations (13)-(16):

$$I_{CELL0} = I_{CELL1} - I_{CELL\_BAL1} \quad (13)$$

$$I_{CELL1} = I_{CELL2} - I_{CELL\_BAL2} \quad (14)$$

$$I_{CELL2} = I_{CELLN-1} - I_{CELL\_BALN-1} \quad (15)$$

$$I_{CELLN-1} = I_{DC-DC} + (I_{BAL1} + I_{BAL2} + \ldots + I_{BALN-1}) \quad (16)$$

where first through fourth cell balancing currents $I_{CELL\_BAL1}$-$I_{CELL\_BALN-1}$ are given by equations (17)-(19) as:

$$I_{CELL\_BAL1} = I_{BAL1}/D_1 \quad (17)$$

$$I_{CELL\_BAL2} = I_{BAL2}/D_2 \quad (18)$$

$$I_{CELL\_BALN-1} = I_{BALN-1}/D_{N-1} \quad (19)$$

$D_1$ is a first duty ratio of switching of the first cell balancing converter 806a and is based on the first balancing control signal $BCTRL_1$, $D_2$ is a second duty ratio of switching of the second cell balancing converter 806b and is based on the second balancing control signal $BCTRL_2$, and $D_{N-1}$ is a third duty ratio of switching of the third cell balancing converter 806c and is based on the third balancing control signal $BCTRL_{N-1}$. The nano-ESS controller 802 further determines values of the first through fourth cell currents $I_{CELL0}$-$I_{CELLN-1}$ based on values of the first through third balancing currents $I\_VAL_1$-$I\_VAL_{N-1}$, a value of the bidirectional DC-DC converter current $I\_VAL_{N-1}$, and the first through third duty ratios $D_1$-$D_{N-1}$.

The third current sensor 810a is connected to a second input terminal of the first cell balancing converter 806a, and the nano-ESS controller 802. The third current sensor 810a measures the first balancing current $I_{BAL1}$ and generates the value of the first balancing current $I\_VAL_1$. The third current sensor 810a further outputs the value of the first balancing current $I\_VAL_1$ to the nano-ESS controller 802. It will be understood by those of skilled in the art that the fourth and fifth current sensors 810b and 810c are structurally and functionally similar to the third current sensor 810a. Thus, the fourth and fifth current sensors 810b and 810c generate the second and third values of the second and third balancing currents $I\_VAL_2$ and $I\_VAL_{N-1}$, respectively. The nano-ESS controller 802 computes the values of the first through fourth cell currents $I_{CELL0}$-$I_{CELLN-1}$ based on the values of the first through third balancing currents $I\_VAL_1$-$I\_VAL_{N-1}$, the value of bidirectional DC-DC converter current $I\_VAL_N$, and the first through third duty ratios $D_1$-$D_{N-1}$.

The sixth current sensor 810d is connected between the negative terminal of the fourth cell 804d and a second input terminal of the bidirectional DC-DC converter 808. The sixth current sensor 810d measures the bidirectional DC-DC current $I_{DC-DC}$ and generates the value of the bidirectional DC-DC converter current $I\_VAL_N$. The sixth current sensor 810d further outputs the value of the bidirectional DC-DC converter current $I\_VAL_N$ to the nano-ESS controller 802.

The second through fifth voltage sensors 812a-812d measure the first through fourth cell voltages $V_{CELL0}$-$V_{CELLN-1}$ and generate values of the first through fourth cell voltages $V\_VAL_0$-$V\_VAL_{N-1}$, respectively. The second through fifth voltage sensors 812a-812d further output the values of the first through fourth cell voltages $V\_V_0$-$V\_V_{N-1}$, respectively, to the nano-ESS controller 802. The first nano-ESS 404a further includes first through fourth temperature sensors 814a-814d that are connected to the first through fourth cells 804a-804d and generate first through fourth temperature values $T\_VAL_0$-$T\_VAL_{N-1}$ of the first through fourth cells 804a-804d, respectively. The first through fourth temperature sensors 814a-814d further output the first through fourth temperature values $T\_VAL_0$-$T\_VAL_{N-1}$, respectively, to the nano-ESS controller 802. The nano-ESS controller 802 further provides the first through third sets of balancing control signals $BCTRL_1$-$BCTRL_{N-1}$, and the set of power control signals PCTRL, based on the values of the first through fourth cell voltages $V\_V_0$-$V\_V_{N-1}$, the values of the first through third balancing currents $I\_VAL1$-$I\_VAL_{N-1}$, the value of bidirectional DC-DC converter current $I\_VAL_N$, and the first through fourth temperature values $T\_VAL_0$-$T\_VAL_{N-1}$ to the nano-ESS controller 802.

The third resistive network 816 is connected across input terminals of the bidirectional DC-DC converter 808. In one embodiment, the third resistive network 816 includes fifth and sixth resistors R5 and R6.

The fourth resistive network 818 is connected across output terminals of the bidirectional DC-DC converter 808. In one embodiment, the fourth resistive network 818 includes seventh and eighth resistors R7 and R8.

The bidirectional DC-DC converter 808 receives the set of power control signals PCTRL from the nano-ESS controller 802, and generates the first nano-ESS voltage $V_{NESS11}$ based on the set of power control signals PCTRL. The bidirectional DC-DC converter 808 has a switching frequency $F_{DC-DC}$. Further, the first nano-ESS voltage $V_{NESS11}$ has a third phase shift $PH_{NESS}$ with respect to the nano-ESS synchronization signal $F_{NESS\_SYNC}$. The bidirectional DC-DC converter 808 functions as buck converter when the multi-source ESS 100 operates in the charging mode. The bidirectional DC-DC converter 808 functions as a boost converter when the multi-source ESS 100 operates in the discharging mode. While operating in the discharging mode, the first through fourth cells 804a-804d generate the first through fourth cell voltages $V_{CELL0}$-$V_{CELLN-1}$, respectively. The input voltage $V_{IN}$ across the first and second input terminals of the bidirectional DC-DC converter 808 is given by the equation (20) which is:

$$V_{IN} = V_{CELL0} + V_{CELL1} + V_{CELL2} + \ldots + V_{CELLN-1} \quad (20)$$

The bidirectional DC-DC converter 808 further receives the input voltage $V_{IN}$ across the first and second input terminals thereof. Based on the power rating of the load (not shown), the bidirectional DC-DC converter 808 draws the bidirectional DC-DC converter current $I_{DC-DC}$ from the array of cells 804. The bidirectional DC-DC converter 808 further generates the first nano-ESS voltage $V_{NESS11}$ across the output terminals thereof based on the set of power control signals PCTRL.

While operating in the charging mode, the first through fourth cells 804a-804d charge to the first through fourth cell voltages $V_{CELL0}$-$V_{CELLN-1}$, respectively. The bidirectional DC-DC converter 808 receives the first nano-ESS voltage $V_{NESS11}$ across the output terminals thereof. Based on the first nano-ESS voltage $V_{NESS11}$, the bidirectional DC-DC converter 808 functions as a buck converter and steps down the first nano-ESS voltage $V_{NESS11}$ to provide power to first through fourth cells 804a-804d having the input voltage $V_{IN}$ based on the set of power control signals PCTRL. Further, the first through fourth cells 804a-804d receive one of a charging current and a charging voltage from the bidirectional DC-DC converter 808.

Figure 9:
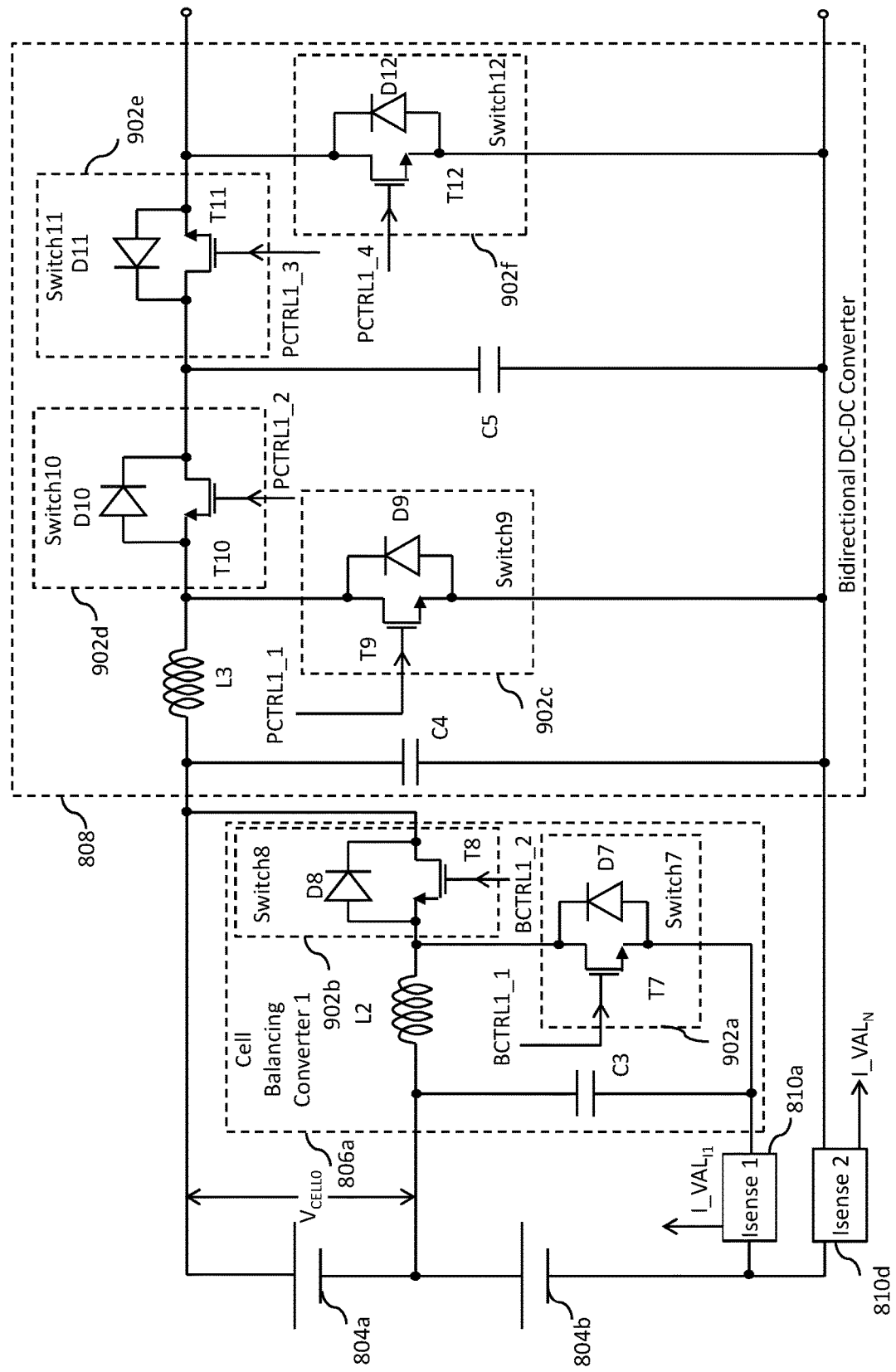
FIG. 9 is a schematic block diagram of a first cell balancing converter and a bidirectional DC-DC converter of the first nano-ESS of FIG. 8, in accordance with an embodiment of the present invention.

Referring now to FIG. 9, the first cell balancing converter 806a and the bidirectional DC-DC converter 808, in accordance with an embodiment of the present invention are shown. The first cell balancing converter 806a includes a third capacitor C3, a second inductor L2, and seventh and eighth switches 902a-902b. The seventh switch 902a includes a seventh transistor T7 and a seventh diode D7. The seventh switch 902a receives a first balancing control signal BCTRL1_1 of the first set of balancing control signals $BCTRL_1$ from the nano-ESS controller 802. The eighth switch 902b includes an eighth transistor T8 and an eighth diode D8. The eighth switch 902b receives a second balancing control signal BCTRL1_2 of the first set of balancing control signals $BCTRL_1$ from the nano-ESS controller 802. The seventh and eighth diodes D7-D8 are connected to the seventh and eighth transistors T7-T8, respectively, in a manner similar to the first diode D1 and the first transistor 1.

The bidirectional DC-DC converter 808 includes a fourth capacitor C4, a third inductor L3, and ninth through twelfth switches 902c-902f. The ninth switch 902c includes a ninth transistor T9 and a ninth diode D9. The ninth switch 902c receives the first power control signal PCTRL1_1 from the nano-ESS controller 802. The tenth switch 902d includes a tenth transistor T10 and a tenth diode D10. The tenth switch 902d receives the second power control signal PCTRL1_2 from the nano-ESS controller 802. The eleventh switch 902e includes an eleventh transistor T11 and an eleventh diode D11. The eleventh switch 902e receives the third power control signal PCTRL1_3 from the nano-ESS controller 802. The twelfth switch 902f includes a twelfth transistor T12 and a twelfth diode D12. The twelfth switch 902f receives the fourth power control signal PCTRL1_4 from the nano-ESS controller 802. The ninth through twelfth diodes D8-D12 are connected to the eighth through twelfth transistors T8-T12, respectively, in a manner similar to the first diode D1 and the first transistor T1.

The first nano-ESS 404a operates in a normal mode, a blocking mode, and a bypass mode. When the first nano-ESS 404a operates in the normal mode, the twelfth switch 902f is turned OFF based on the fourth power control signal PCTRL1_4. The eleventh switch 902e is turned ON based on the third power control signal PCTRL1_3. Further the ninth and tenth switches 902c and the 902d switch between ON and OFF states based on the first and second power control signals PCTRL1_1 and PCTRL1_2, respectively. When the first nano-ESS 404a operates in the blocking mode, the ninth through twelfth switches 902c-902f are turned OFF based on the first through fourth power control signals PCTRL1_1-PCTRL1_4. When the first nano-ESS 404a operates in the bypass mode of operation, the ninth through eleventh switches 902c-902e are turned OFF based on the first through third power control signals PCTRL1_1-PCTRL1_3. Further, the twelfth switch 902f is turned ON based on the fourth power control signal PCTRL1_4.

In operation, when the multi-source ESS 100 operates in the discharging mode, the first through fourth cells 804a-804d generate the first through fourth cell voltages $V_{CELL0}$-$V_{CELLN-1}$, respectively, between the corresponding positive terminals and the corresponding negative terminals thereof. In one embodiment, the multi-source ESS 100 includes three ESSs, i.e., the first through third ESSs 104a-104c. The first ESS 104a includes three micro-ESSs, i.e., the first through third micro-ESSs 204a-204c. The first micro-ESS 204a includes nine nano-ESSs, i.e., the first through ninth nano-ESSs 404a-404c. The first nano-ESS 404a includes four cells, i.e., the first through fourth cells 804a-804d. Hence, the first nano-ESS 404a includes three cell balancing converters, i.e., the first through third cell balancing converters 806a-806c. The first through third cell balancing converters 806a-806c generate the first through third balancing currents $I_{BAL1}$-$I_{BALN-1}$, respectively. In one example, the load has a requirement of 120V AC. Hence, the first nano-ESS 404a is required to operate as a current source and generate the first nano-ESS current $I_{NESS11}$, such the first nano-ESS voltage $V_{NESS11}$ is at 24V DC. The input voltage $V_{IN}$ varies between 12V-15.5V DC depending on the first through fourth SOCs. Since, the first through fourth cells 804a-804d are connected in series, each of the first through fourth cell voltages $V_{CELL0}$-$V_{CELLN-1}$ vary between 3V-4V. However, the third cell 804c generates the third cell voltage $V_{CELL2}$ between 3V-3.5V due to variations in operating conditions such as temperature or internal electrochemical processes. The nano-ESS controller 802 thus receives the values of the first through fourth cell voltages V_VAL$_0$-V_V$_{N-1}$ respectively, and the value of the bidirectional DC-DC converter current I_VAL$_{N-1}$. The nano-ESS controller 802 further controls the first through third balancing currents $I_{BAL1}$-$I_{BALN-1}$ such that the first, second, and fourth cell voltages $V_{CELL0}$, $V_{CELL1}$, and $V_{CELLN-1}$ vary between 3V-4V, while the third cell voltage $V_{CELL2}$ varies between 3V-3.5V. Based on the value of the third cell voltage V_V$_2$, the nano-ESS controller 802 generates the set of balancing control signals $BCTRL_1$-$BCTRL_{N-1}$ to balance the charge and discharge rates of the first through fourth cells 804a-804d.

The bidirectional DC-DC converter 808 receives the input voltage $V_{IN}$ varying between 12V-15.5V DC. The bidirectional DC-DC converter 808 acts as a boost converter when the multi-source ESS 100 operates in the discharging mode. The bidirectional DC-DC converter 808 further discharges the cells and steps up the input voltage $V_{IN}$ from 12 V-15.5 V DC to 24V DC nominal.

The second through ninth nano-ESSs 404a-404i also operate as current sources and further generate second through ninth nano-ESS currents $I_{NESS12}$-$I_{NESSMN}$, and the second through ninth nano-ESS voltage $V_{NESS12}$-$V_{NESSMN}$ at 24 V DC nominal in a manner similar as described above. The micro-ESS controller 402 maintains the total array voltage $V_{PWM}$ across the input terminals of the PWM 406 at 72V DC based on the first through ninth sets of nano-ESS communication signals and the nano-ESS synchronization-control signal $NESS_{SYNCTRL}$. The PWM 406 hence receives the array total voltage $V_{PWM}$ and regulates the array total voltage $V_{PWM}$ at 72V DC. The PWM 406 generates the micro-ESS voltage $V_{MESS1}$ at 40V AC nominal based on the set of PWM control signals $PWM_{CTRL}$.

The second and third micro-ESSs 204b and 204c further generate the second and third micro-ESS voltages $V_{MESS2}$ and $V_{MESSN}$ at 40 AC nominal, respectively, in a similar manner as described above. The first filter 206 receives the unfiltered micro-ESS voltage $V_{UF\_ESS}$ at 120V AC nominal and eliminates the switching noise therefrom. The first filter 206 further outputs the first ESS voltage $V_{ESS1}$ at 120V AC across output terminals thereof. Hence, the multi-source ESS 100 meets the voltage rating of the load (not shown) for powering the load. The load further draws a desired current from the multi-source ESS 100 based on the operating parameters thereof.

When the multi-source ESS 100 operates in the charging mode, the first ESS 104a is connected to one or more of the charging circuit (not shown), the electric grid (not shown), and the micro-grid (not shown). The charging circuit (not shown) may generate one of an AC or a DC voltage as a charging voltage across output terminals of the first ESS 104a. In a scenario, one or more of the first through fourth cells 804a-804d are discharged to a minimum cell operating voltage of each of the first through fourth cells 804a-804d at 3 V, i.e., the first through fourth cell voltages $V_{CELL0}$-$V_{CELLN-1}$ are at 3 V and need to be charged to a maximum cell operating voltage of each of the first through fourth cells 804a-804d. The first nano-ESS 404a has a nominal voltage rating of 24V DC. Each of the first through fourth cells 804a-804d needs to be charged to generate 4V DC. Alternatively, the first through fourth cell voltages $V_{CELL0}$-$V_{CELLN-1}$ need to be at 4V DC. However, each of the first through fourth cell voltages $V_{CELL0}$-$V_{CELLN-1}$ is at 3V. The nano-ESS controller 802 hence receives the values of the first through fourth cell voltages V_V$_0$-V_V$_{N-1}$ indicating that each of the first through fourth cells 804a-804d is at the minimum cell operating voltage. In a scenario, where a voltage received by the bidirectional DC-DC converter 808 is higher as compared to the input voltage $V_{IN}$, the bidirectional DC-DC converter 808 acts as a buck converter to charge the first through fourth cells 804a-804d. In an example, if the bidirectional DC-DC converter 808 receives 24V DC nominal across its output terminals. Hence, the maximum cell operating voltage of the first through fourth cells 804a-804d is 4V DC each. Further, the bidirectional DC-DC converter 808 acts as a buck converter, and outputs a charging current across input terminals thereof. The bidirectional DC-DC converter 808 further charges the first through fourth cells 804a-804d till each of the first through fourth cells 804a-804d generate the first through fourth cell voltages $V_{CELL0}$-$V_{CELLN-1}$, respectively, at the maximum cell operating voltage, i.e., 4 V DC. The bidirectional DC-DC converter 808 further charges the first through fourth cells 804a-804d at a charging voltage of 16V DC till the charging current reaches a minimum charging current.

It will be apparent to a person skilled in the art that the first through third micro-ESS voltages $V_{MESS1}$-$V_{MESSN}$ may vary around 40V AC nominal based on a mismatch in cells in the first through third micro-ESSs 204a-204c. Similarly, it will be apparent to a person skilled in the art that the first through ninth nano-ESS voltages $V_{NESS11}$-$V_{NESSN1}$ may vary around 24V DC nominal based on a mismatch among cells in the first through ninth nano-ESS 404a-404i.

Figures 10A, 10B:
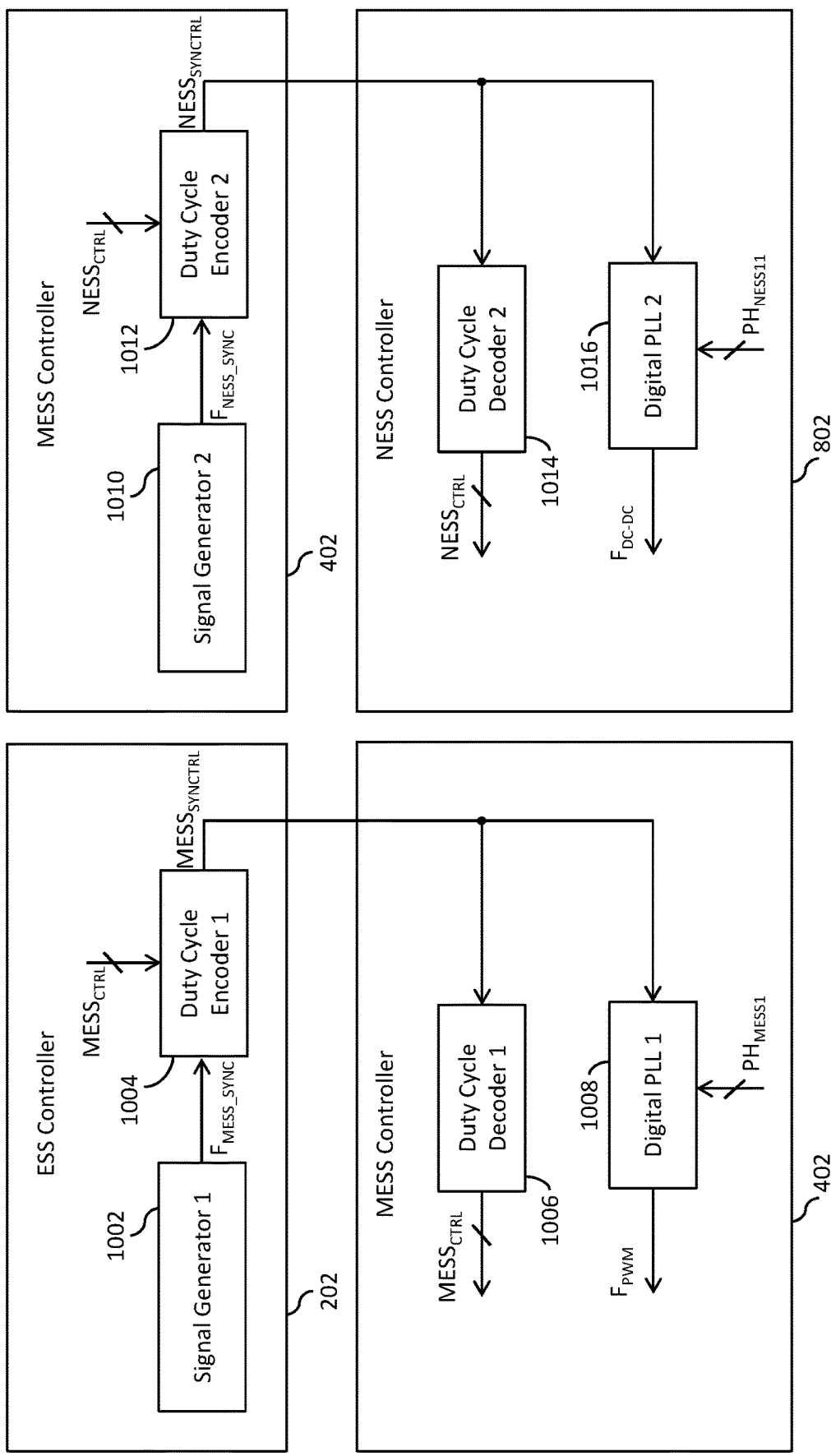
FIG. 10A is a schematic block diagram of an ESS controller of FIG. 1, and a micro-ESS controller of FIG. 4 in accordance with an embodiment of the present invention.
FIG. 10B is a schematic block diagram of the micro-ESS controller of FIG. 4, and a nano-ESS controller of FIG. 8 in accordance with an embodiment of the present invention.

Referring now to FIG. 10A, a schematic block diagram of the ESS controller 202 of the micro-ESS controller 402 in accordance with an embodiment of the present invention is shown. The ESS controller 202 includes a first signal generator 1002, and a first duty cycle encoder 1004. The micro-ESS controller 402 includes a first duty cycle decoder 1006, and a first digital phase locked loop (PLL) 1008. The first signal generator 1002 generates the micro-ESS synchronization signal $F_{MESS\_SYNC}$ and outputs the micro-ESS synchronization signal $F_{MESS\_SYNC}$ to the first duty cycle encoder 1004. The first duty cycle encoder 1004 receives the multi-bit micro-ESS control signal $MESS_{CTRL}$. One or more bits of the multi-bit micro-ESS control signal $MESS_{CTRL}$ may represent one of an error in first ESS voltage $V_{ESS1}$, an error in the first ESS current $I_{ESS1}$, a "Start charging command", a "Start discharging" command, a "Stop" command, and a line frequency zero crossing signal. The first duty cycle encoder 1004 further encodes the micro-synchronization signal $F_{MESS\_SYNC}$ with the multi-bit micro-ESS control signal $MESS_{CTRL}$ and generates the micro-ESS synchronization-control signal $MESS_{SYNTRL}$. The first duty cycle decoder 1006 further receives the micro-ESS synchronization-control signal $MESS_{SYNCTRL}$ and decodes the micro-ESS synchronization-control signal $MESS_{SYNCTRL}$ to generate the multi-bit micro-ESS control signal $MESS_{CTRL}$. The first digital phase locked loop (PLL) 1008 receives the micro-ESS synchronization-control signal $MESS_{SYNCTRL}$ and generates a PWM switching frequency signal $F_{PWM}$ that has a fourth phase shift $PH_{MESS1}$ with respect to the first synchronization signal $F_{MESS\_SYNC}$.

Referring now to FIG. 10B, a schematic block diagram of the micro-ESS controller 402 and the nano-ESS controller 802 in accordance with an embodiment of the present invention is shown. The micro-ESS controller 402 includes a second signal generator 1010, and a second duty cycle encoder 1012. The nano-ESS controller 802 includes a second duty cycle decoder 1014 and a second digital PLL 1016. The second signal generator 1010 generates the nano-ESS synchronization signal $F_{NESS\_SYNC}$ and outputs the nano-ESS synchronization signal $F_{NESS\_SYNC}$ to the second duty cycle encoder 1012. The second duty cycle encoder 1012 receives the multi-bit nano-ESS control signal $NESS_{CTRL}$. One or more bits of the multi-bit nano-ESS control signal $NESS_{CTRL}$ may represent one an error in first micro-ESS voltage $V_{MESS1}$, an error in the first micro-ESS current $I_{ESS1}$, the "Start charging" command, the "Start discharging" command, and a "Stop" command. The second duty cycle encoder 1012 further encodes the nano-ESS synchronization signal $F_{NESS\_SYNC}$ with the multi-bit nano-ESS control signal $NESS_{CTRL}$ and generates the nano-ESS synchronization-control signal $NESS_{SYNCTRL}$. The second duty cycle decoder 1014 further receives the nano-ESS synchronization-control signal $NESS_{SYNCTRL}$ and decodes the nano-ESS synchronization-control signal $NESS_{SYNCTRL}$ to generate the multi-bit nano-ESS control signal $NESS_{CTRL}$. The second digital PLL 1016 receives the nano-ESS synchronization-control signal $NESS_{SYNCTRL}$ and generates a DC-DC switching frequency signal $F_{DC-DC}$ that has the third phase shift $PH_{NESS}$ with respect to the second synchronization signal $F_{NESS\_SYNC}$.

Figure 11:
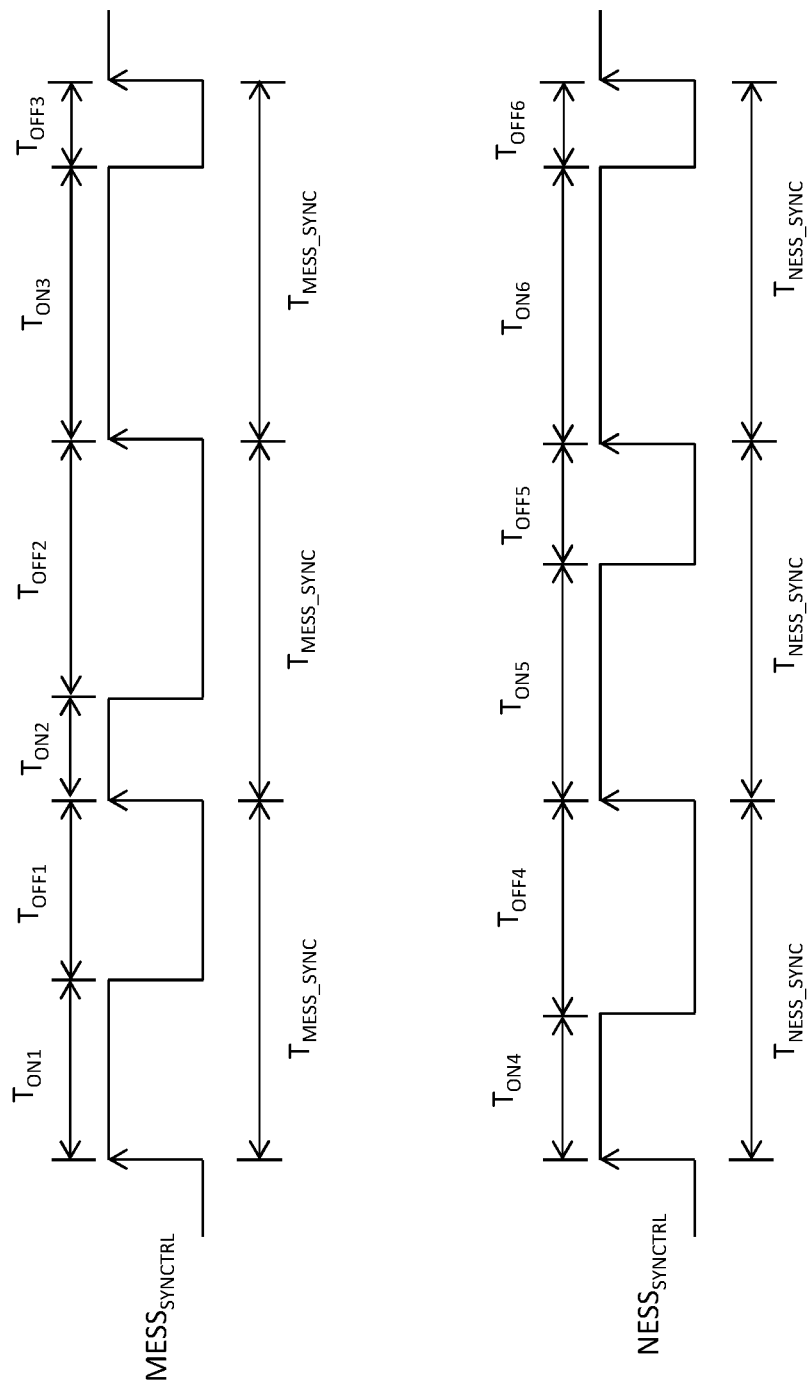
FIG. 11 is a timing diagram of a micro-ESS synchronization-control signal, and a nano-ESS synchronization-control signal, in accordance with an embodiment of the present invention.

Referring now to FIG. 11, a timing diagram that illustrates the micro-ESS synchronization-control signal $MESS_{SYNCTRL}$, and the nano-ESS synchronization-control signal $NESS_{SYNCTRL}$, in accordance with an embodiment of the present invention is shown. The micro-ESS synchronization signal $F_{MESS\_SYNC}$ is a square wave digital signal having a time period of $T_{SYNC}$. The first duty cycle encoder 1004 receives the multi-bit micro-ESS control signal $MESS_{CTRL}$ and generates the micro-ESS synchronization-control signal $MESS_{SYNCTRL}$. The micro-ESS synchronization-control signal $MESS_{SYNCTRL}$ has a first duty cycle during a first clock cycle of the micro-ESS synchronization signal $F_{MESS\_SYNC}$ based on the multi-bit micro-ESS control signal $MESS_{CTRL}$. The first duty cycle is equal to a ratio of a first ON time $T_{ON1}$ of the micro-ESS synchronization-control signal $MESS_{SYNCTRL}$ to a first OFF time $T_{OFF1}$ of the micro-ESS synchronization-control signal $MESS_{SYNCTRL}$. Similarly, the micro-ESS synchronization-control signal $MESS_{SYNCTRL}$ has second and third duty cycles during second and third clock cycles, respectively, of the micro-ESS synchronization signal $F_{MESS\_SYNC}$. The second duty cycle is equal to a ratio of a second ON time $T_{ON2}$ of the micro-ESS synchronization-control signal $MESS_{SYNCTRL}$ to a second OFF time $T_{OFF2}$ of the micro-ESS synchronization-control signal $MESS_{SYNCTRL}$. The third duty cycle is equal to a ratio of a third ON time $T_{ON3}$ of the micro-ESS synchronization-control signal $MESS_{SYNCTRL}$ to a third OFF time $T_{OFF3}$ of the micro-ESS synchronization-control signal $MESS_{SYNCTRL}$. Each of the first through third duty cycles vary based on the multi-bit micro-ESS control signal $MESS_{CTRL}$. The first duty cycle decoder 1006 extracts the multi-bit micro-ESS control signal $MESS_{CTRL}$ based on the first through third duty cycles.

The second duty cycle encoder 1012 receives the multi-bit nano-ESS control signal $NESS_{CTRL}$ and generates the nano-ESS synchronization-control signal $NESS_{SYNCTRL}$. The nano-ESS synchronization-control signal $NESS_{SYNCTRL}$ has a fourth duty cycle during the first clock cycle of the nano-ESS synchronization signal $F_{NESS\_SYNC}$ based on the multi-bit nano-ESS control signal $NESS_{CTRL}$. The fourth duty cycle is equal to a ratio of a fourth ON time $T_{ON4}$ of the nano-ESS synchronization-control signal $NESS_{SYNCTRL}$ to a fourth OFF time $T_{OFF4}$ of the nano-ESS synchronization-control signal $NESS_{SYNCTRL}$. Similarly, the nano-ESS synchronization-control signal $NESS_{SYNCTRL}$ has fifth and sixth duty cycles during second and third clock cycles, respectively, of the synchronization signal $F_{SYNC}$. The fifth duty cycle is equal to a ratio of a fifth ON time $T_{ON5}$ of the nano-ESS synchronization-control signal $NESS_{SYNCTRL}$ to a fifth OFF time $T_{OFF5}$ of the nano-ESS synchronization-control signal $NESS_{SYNCTRL}$. The sixth duty cycle is equal to a ratio of a sixth ON time $T_{ON6}$ of the nano-ESS synchronization-control signal $NESS_{SYNCTRL}$ to a sixth OFF time $T_{OFF6}$ of the nano-ESS synchronization-control signal $NESS_{SYNCTRL}$. Each of the fourth through sixth duty cycles vary based on the multi-bit nano-ESS control signal $NESS_{CTRL}$. The second duty cycle decoder 1014 extracts the multi-bit nano-ESS control signal $NESS_{CTRL}$ based on the fourth through sixth duty cycles.

Figure 12:
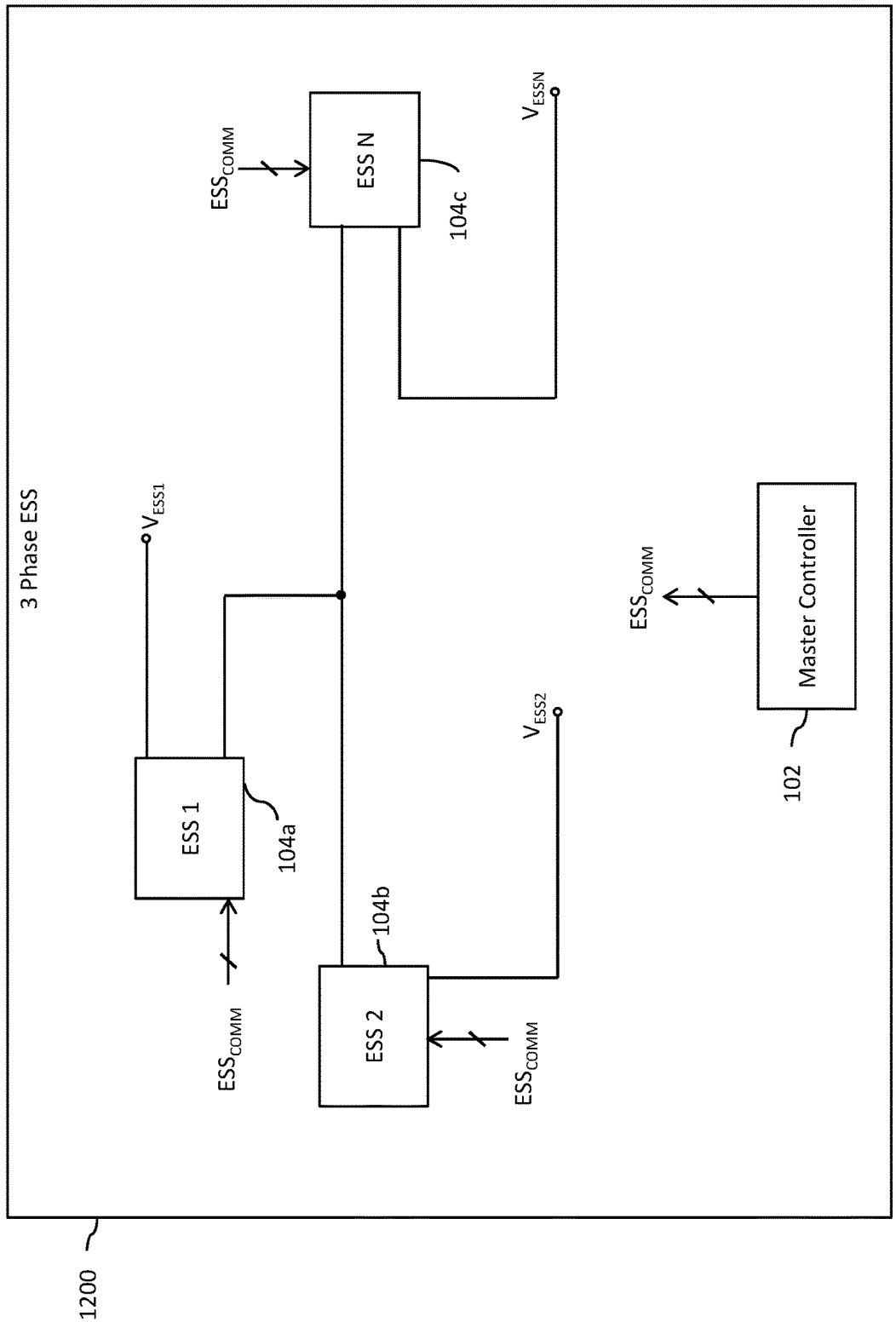
FIG. 12 is a schematic block diagram of a three-phase ESS in accordance with an embodiment of the present invention.

Referring now to FIG. 12, a three-phase ESS 1200, in accordance with an embodiment of the present invention is shown. The three-phase ESS 1200 includes the first through third ESSs 104a-104c that are connected in a Wye connection and generate the first through third ESS voltages $V_{ESS1}$-$V_{ESSN}$, respectively. The first through third ESS voltages $V_{ESS1}$-$V_{ESSN}$ have a phase shift of 120° therebetween. It will be apparent to a person skilled in the art that the first, through third ESSs 104a-104c can also be connected in a delta connection for generating the first through third ESS voltages $V_{ESS1}$-$V_{ESSN}$, respectively, at a phase shift of 120°. The three-phase ESS 1200 may be connected to three phase devices such as an induction motor, three phase home appliances, a three phase electric grid, and the like. It will further be apparent to a person skilled in the art that the three-phase ESS 1200 may include additional ESSs for forming a multi-phase ESS (not shown).

Figure 13:
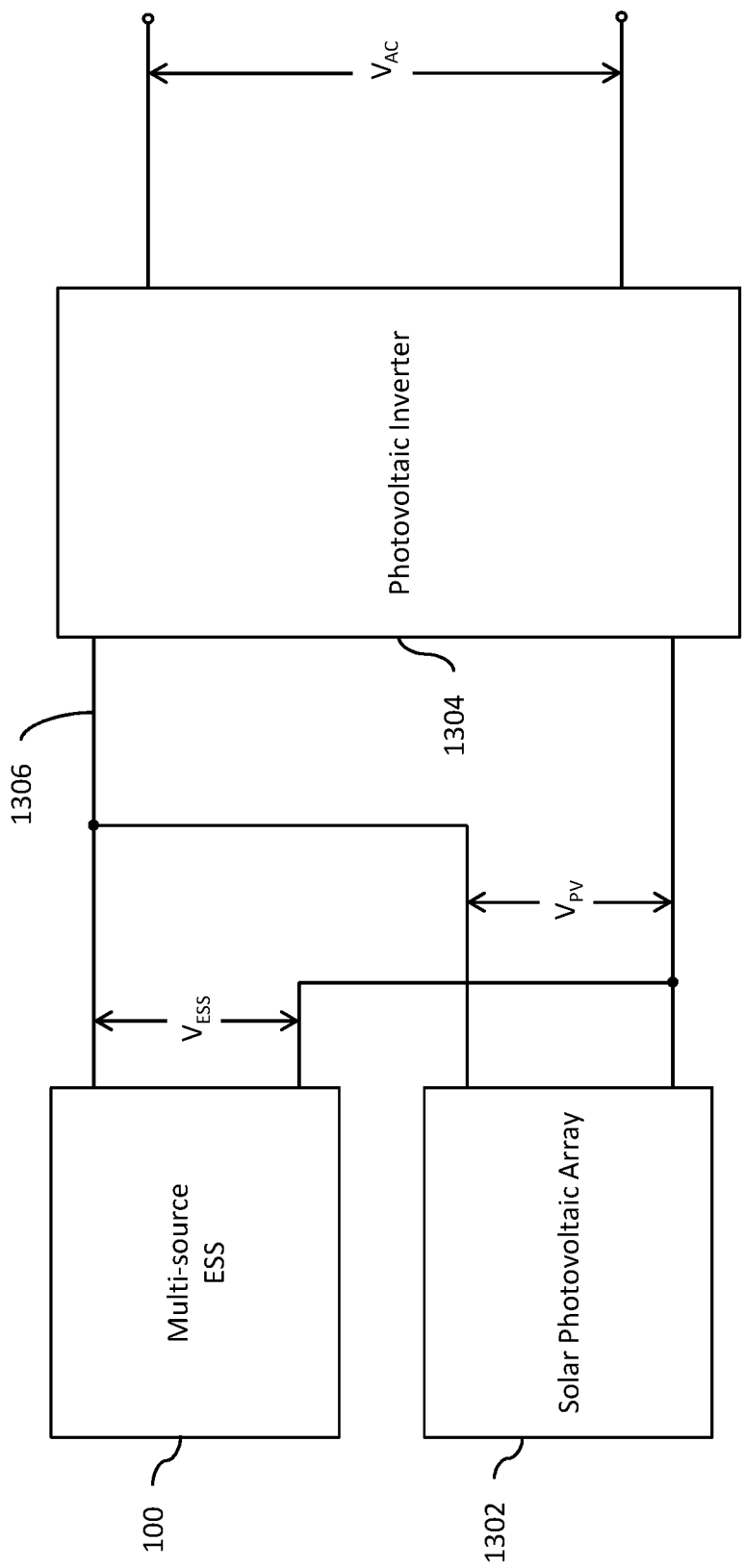
FIG. 13 is a schematic block diagram of a solar photovoltaic array connected to the multi-source ESS of FIG. 1, and a photovoltaic inverter, in accordance with an embodiment of the present invention.

Referring now to FIG. 13, a schematic block diagram of the multi-source ESS 100 that is connected to a solar photovoltaic array 1302 in accordance with an embodiment of the present invention is shown. The solar photovoltaic array 1302 may work in conjunction with the multi-source ESS 100 to provide power to one of the load, the electric grid, and the micro-grid. The solar photovoltaic array 1302 and the multi-source ESS 100 are further connected to a photovoltaic inverter 1304. The multi-source ESS 100, the solar photovoltaic array 1302, and the photovoltaic inverter 1304 are connected to each other by way of a common voltage bus 1306. The solar photovoltaic array 1302 includes multiple solar photovoltaic modules (not shown) that are connected in at least one of a series and a parallel connection. The solar photovoltaic array 1302 generates a photovoltaic voltage $V_{PV}$. In one scenario, the solar photovoltaic array 1302 is the charging circuit and the photovoltaic inverter 1304 is not operational. The multi-source ESS 100 performs maximum power point tracking (MPPT) on the solar photovoltaic array 1302 while the solar photovoltaic array 1302 charges the multi-source ESS 100. In another scenario, the photovoltaic array 1302 charges the multi-source ESS 100 while providing power to one of the load (not shown), the electric grid (not shown), and the micro-grid (not shown) by way of the photovoltaic inverter 1304. The multi-source ESS 100 draws power from solar photovoltaic array 1302 at a constant charge power determined by the master controller 102 while the photovoltaic inverter 1304 performs MPPT on the solar photovoltaic array 1302. When the multi-source ESS 100 operates in the discharging mode, the multi-source ESS 100 maintains a constant discharge power while the photovoltaic inverter 1304 performs MPPT on the solar photovoltaic array 1302. In yet another scenario, the solar photovoltaic array 1302 is not operational while the photovoltaic inverter 1304 charges or discharges the multi-source ESS 100. Hence, the solar photovoltaic array 1302 and the multi-source ESS 100 generate the first ESS voltage $V_{ESS1}$ and the photovoltaic voltage $V_{PV}$, respectively, across input terminals of the photovoltaic inverter 1304 as DC voltages. The photovoltaic inverter 1304 further generates an AC voltage $V_{AC}$ across output terminals thereof based on the first ESS voltage $V_{ESS1}$ and the photovoltaic voltage $V_{PV}$. The photovoltaic inverter 1304 may be connected to one or more of an AC load (not shown), the electric grid (not shown), and the micro-grid (not shown) for receiving the AC voltage $V_{AC}$. The multi-source ESS 100 may further receive power from or provide power to the electric grid (not shown) by way of the photovoltaic inverter 1304.

Figure 14:
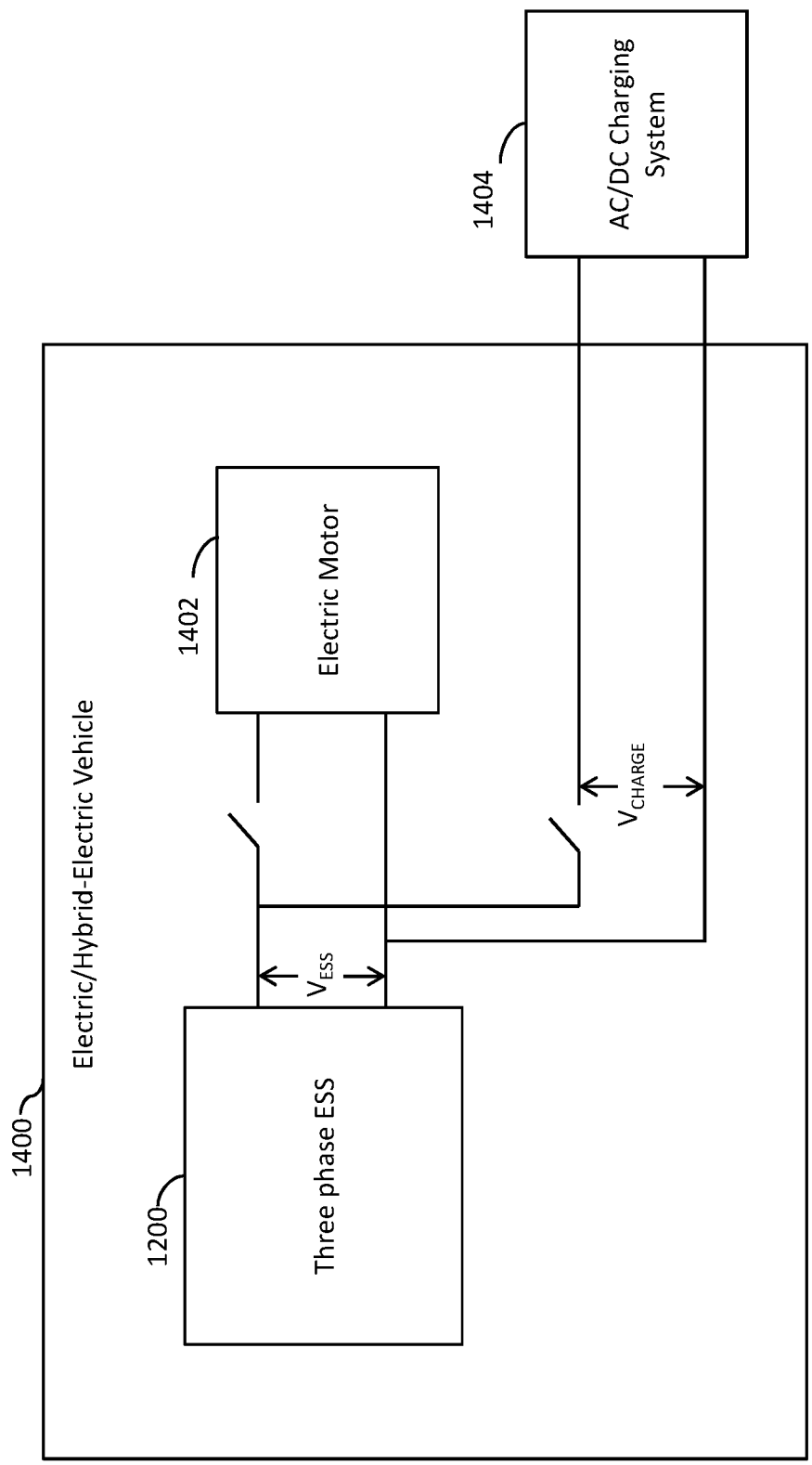
FIG. 14 is a schematic block diagram of an electric (or hybrid-electric) vehicle that includes the three-phase ESS of FIG. 12, in accordance with an embodiment of the present invention.

Referring now to FIG. 14, a schematic block diagram of an electric (or hybrid-electric) vehicle 1400 that employs the three-phase ESS 1200 in accordance with an embodiment of the present invention is shown. The electric vehicle 1400 includes the three-phase ESS 1200 and an electric motor 1402. The electric motor 1402 may be an AC motor or a DC motor. In an embodiment, an AC/DC charging system 1404 is connected to the three-phase ESS 1200. The AC/DC charging system 1404 generates a charging voltage $V_{charge}$ for charging the three-phase ESS 1200, when the three-phase ESS 1200 operates in the charging mode. Further, the three-phase ESS 1200 may also be configured to receive the charging voltage $V_{charge}$ as an AC or a DC voltage. In one embodiment, the AC/DC charging system 1404 includes multiple of batteries that are external to the three-phase ESS 1200. The AC/DC charging system 1404 may also be connected to a charging station. In another embodiment, the electric vehicle 1400 may include an on-board set of batteries that charge the three-phase ESS 1200 when the three-phase ESS 1200 operates in the charging mode. When the three-phase ESS 1200 is charged, the master controller 102 disconnects the three-phase ESS 1200 from the AC/DC charging system 1404. When the three-phase ESS 1200 operates in the discharging mode, the three-phase ESS 1200 outputs the first through third ESS voltages $V_{ESS1}$-$V_{ESSN}$ as the ESS voltage $V_{ESS}$ to power the electric motor 1402. The three-phase ESS 1200 may further draw power from the electric motor 1402 during regenerative braking. The three-phase ESS 1200 may further be configured to generate the ESS voltage $V_{ESS}$ as a DC voltage for powering the electric motor 1402, when the electric motor 1402 is a DC motor.

Figure 15:
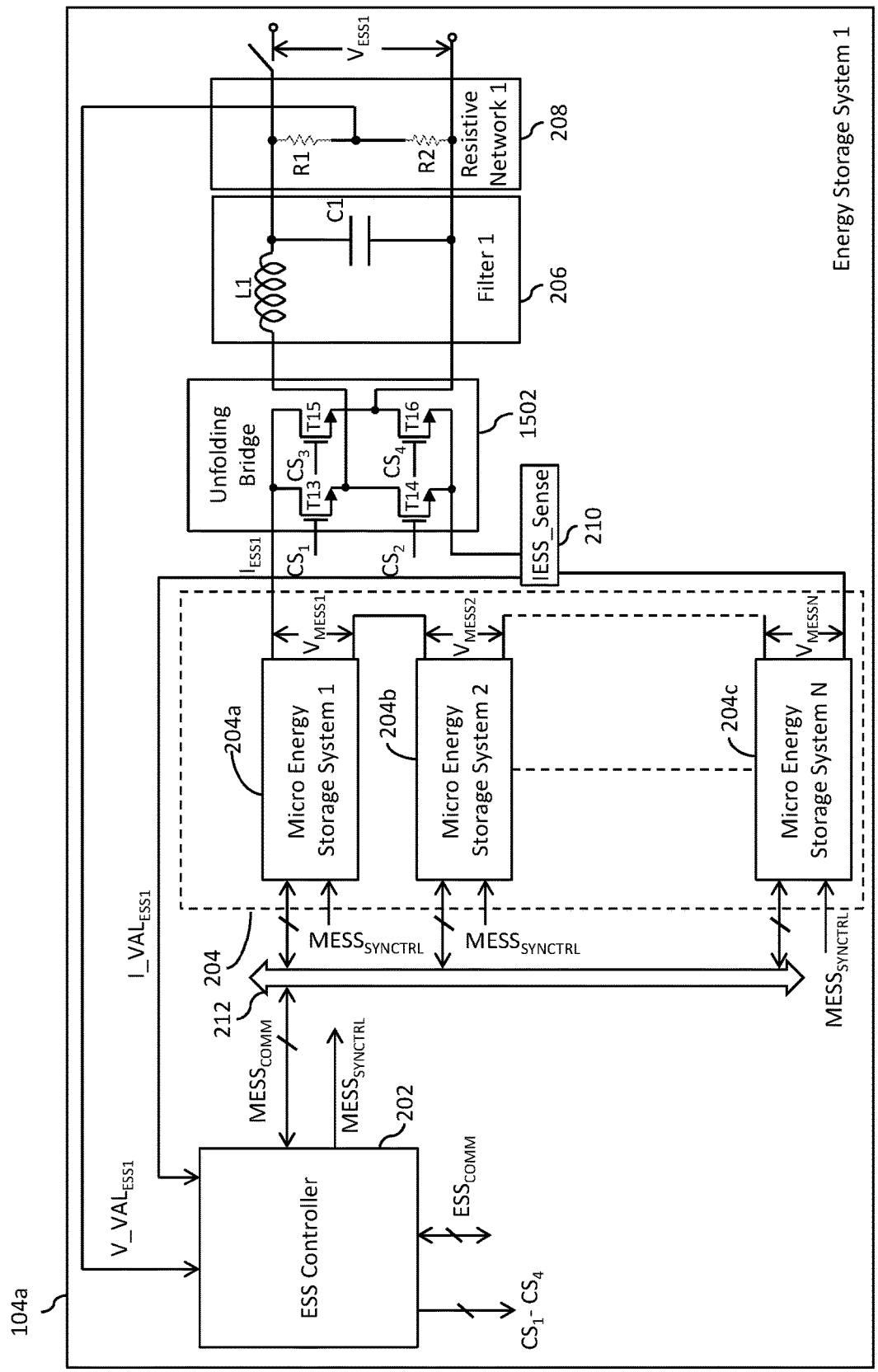
FIG. 15 is a schematic block diagram of the first ESS of FIG. 1, that includes an unfolding bridge, in accordance with an embodiment of the present invention.

Referring now to FIG. 15, a schematic block diagram of the first ESS 104a that includes an unfolding bridge 1502 in accordance with another embodiment of the present invention is shown. First and second input terminals of the unfolding bridge 1502 are connected across the array of micro-ESSs 204. First and second output terminals of the unfolding bridge 1502 are connected to the first filter 206. The unfolding bridge 1502 includes thirteenth through sixteenth transistors T13-T16. A drain terminal of the thirteenth transistor T13 is connected to the first input terminal of the unfolding bridge 1502. A source terminal of the thirteenth transistor T13 is connected to the first output terminal of the unfolding bridge 1502. A gate terminal of the thirteenth transistor T13 is connected to the ESS controller 202 for receiving a first control signal $CS_1$. A drain terminal of the fourteenth transistor T14 is connected to the first output terminal of the unfolding bridge 1502. A source terminal of the fourteenth transistor T14 is connected to the second input terminal of the unfolding bridge 1502. A gate terminal of the fourteenth transistor T14 is connected to the ESS controller 202 for receiving a second control signal $CS_2$. A drain terminal of the fifteenth transistor T15 is connected to the first input terminal of the unfolding bridge 1502. A source terminal of the fifteenth transistor T15 is connected to the second output terminal of the unfolding bridge 1502. A gate terminal of the fifteenth transistor T15 is connected to the ESS controller 202 for receiving a third control signal $CS_3$. A drain terminal of the sixteenth transistor T16 is connected to the second output terminal of the unfolding bridge 1502. A source terminal of the sixteenth transistor T16 is connected to the second input terminal of the unfolding bridge 1502. A gate terminal of the sixteenth transistor T16 is connected to the ESS controller 202 for receiving a fourth control signal $CS_4$. The ESS controller 202 controls the switching of the thirteenth through sixteenth transistors T13-T16 based on the first through fourth control signals CS$_1$-CS$_4$, respectively. In one scenario, the unfolding bridge 1502 receives the unfiltered ESS voltage V$_{UF\_ESS}$ across the first and second input terminals thereof as a rectified sinusoidal voltage. The unfolding bridge 1502 further converts the unfiltered ESS voltage V$_{UF\_ESS}$ from a rectified sinusoidal voltage to a fully sinusoidal voltage based on the first through fourth control signals CS$_1$-CS$_4$ and outputs a sinusoidal unfiltered ESS voltage V$_{SUF\_ESS}$ to the first filter 206. The first filter 206 removes the switching noise from the sinusoidal unfiltered ESS voltage V$_{SUF\_ESS}$ and generates a sinusoidal ESS voltage V$_{sinusoid}$.

Figure 16:
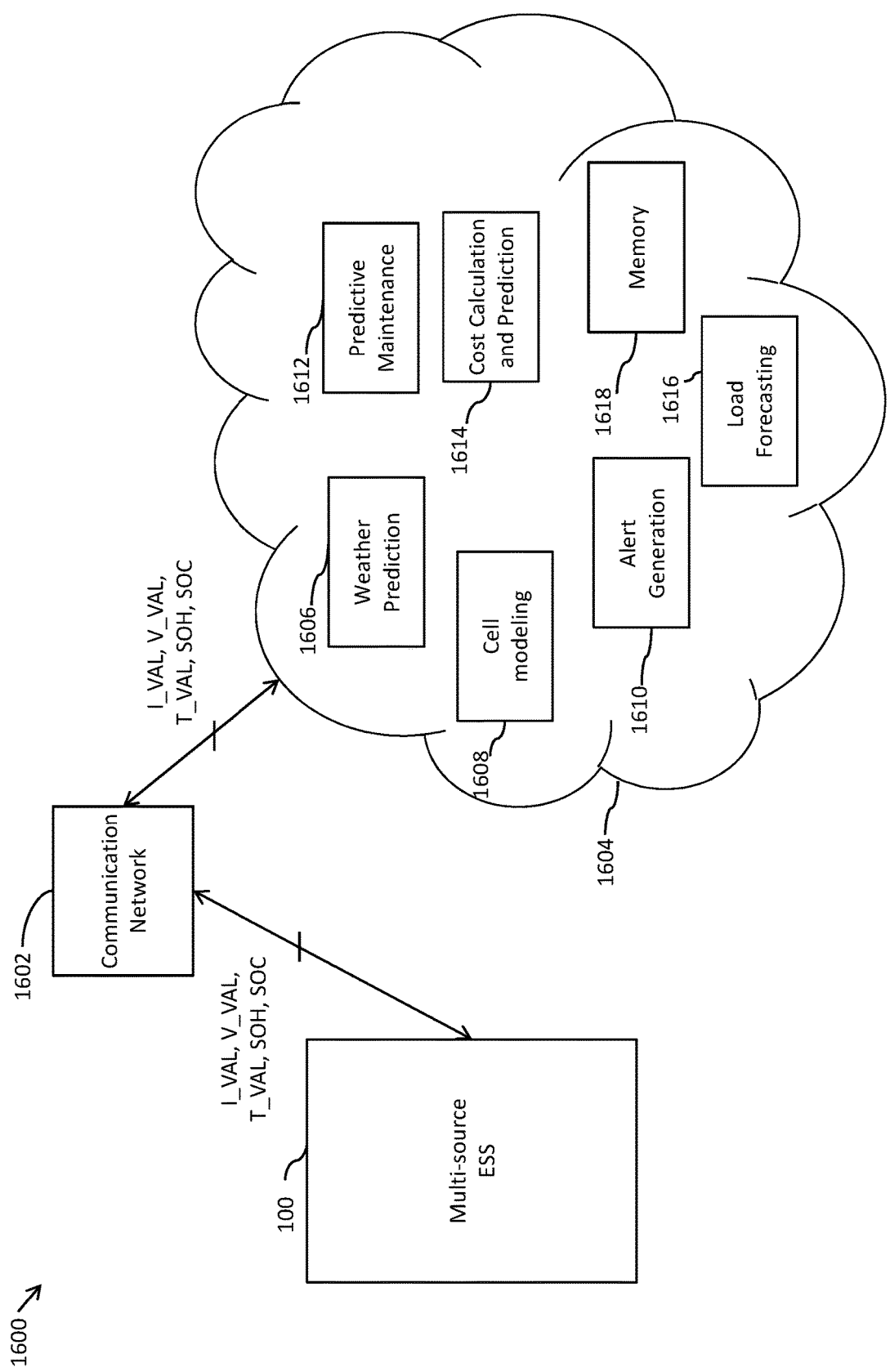
FIG. 16 is a schematic block diagram of a communication environment, in accordance with an embodiment of the present invention.

Referring now to FIG. 16, a communication environment 1600 in accordance with an embodiment of the present invention is shown. The communication environment 1600 includes the multi-source ESS 100, a communication network 1602, and a cloud server 1604. The communication network 1602 is a medium through which the multi-source ESS 100 transmits data relating to the operation thereof to the cloud server 1604. Examples of the communication network 1602 include, but are not limited to, a satellite network, the Internet, a radio frequency (RF) network, or any combination thereof. The multi-source ESS 100 may further include devices that connect to the communication network 1602 in accordance with various wireless communication protocols, such as Transmission Control Protocol and Internet Protocol (TCP/IP), 2$^{nd}$ Generation (2G), 3$^{rd}$ Generation (3G), 4$^{th}$ Generation (4G), long term evolution (LTE) communication protocols, or any combination thereof. The cloud server 1604 further includes a weather prediction device 1606, a cell modelling device 1608, an alert generation device 1610, a predictive maintenance device 1612, a cost calculation and prediction device 1614, and a load forecasting device 1616. The cloud server 1604 further includes a memory 1618 that stores computer readable instructions for hosting a mobile application.

The mobile application may be installed on computing devices of users of the multi-source ESS 100. The mobile application is further hosted on the cloud server 1604. The mobile application presents the users with a GUI by way of which the users may interact with the mobile application. The mobile application displays all the operation parameters related to the multi-source ESS 100. The mobile application further displays various graphs that depict parameters such as power consumption, predicted lifetime, usage cost, ambient temperature and the like, against time. The mobile application further displays weather patterns, load forecasts, cell modelling data, and optimum usage conditions of the multi-source ESS 100 to the users.

The multi-source ESS 100 transmits the value of the ESS parameters to the cloud server 1604 by way of the communication network 1602. In one embodiment the multi-source ESS 100 transmits the value of the first ESS current I_VAL$_{ESS1}$, the values of the first through third balancing currents I_VAL$_1$-I_VAL$_{N-1}$ the value of the bidirectional DC-DC converter current I_VAL$_N$, the values of the first through fourth cell voltages V_V$_0$-V_V$_{N-1}$, and the values of the first through fourth cell temperatures T_VAL$_0$-T_VAL$_{N-1}$, to the cloud server 1604 by way of the communication network 1602. The cloud server 1604 further stores the value of the ESS current I_VAL$_{ESS}$, the values of the first through third balancing currents I_VAL$_1$-I_VAL$_{N-1}$, the value of the bidirectional DC-DC converter current I_VAL$_N$, the values of the first through fourth cell voltages V_V$_0$-V_V$_{N-1}$, and the values of the first through fourth cell temperatures T_VAL$_0$-T_VAL$_{N-1}$, in a memory 1618. The weather prediction device 1606 includes suitable circuitry that performs weather prediction depending on the operation of the multi-source ESS 100. In one example, the weather prediction device 1606 determines that the values of the first through fourth cell temperatures T_VAL$_0$-T_VAL$_{N-1}$ are greater than a threshold temperature for a specified time. The weather prediction device 1606 further employs algorithms to determine an ambient temperature, and predict an ambient temperature.

The predictive maintenance device 1612 receives the value of the ESS current I_VAL$_{ESS}$, the values of the first through third balancing currents I_VAL$_1$-I_VAL$_{N-1}$, the value of the bidirectional DC-DC converter current I_VAL$_N$, the values of the first through fourth cell voltages V_V$_0$-V_V$_{N-1}$, and the values of the first through fourth cell temperatures T_VAL$_0$-T_VAL$_{N-1}$, from the memory 1618. The predictive maintenance device 1612 includes suitable circuitry that performs various functions such as predicting the life of a cell, determining if any of the array of ESSs 104, the array of micro-ESSs 204, the array of nano-ESSs 404, and the array of cells 804 need replacement or when the multi-source ESS 100 needs servicing, and the like. In one example, the predictive maintenance device 1612 determines that the first cell 804a does not charge to the maximum cell operating voltage. Hence, the value of the first cell voltage V_V$_0$ remains less than a cell threshold voltage over a specified time period. The predictive maintenance device 1612 hence determines that the first cell 804a is damaged, and needs to be replaced.

The cell modelling device 1608 retrieves the value of the ESS current I_VAL$_{ESS}$, the values of the first through third balancing currents I_VAL$_1$-I_VAL$_{N-1}$, the value of the bidirectional DC-DC converter current I_VAL$_N$, the values of the first through fourth cell voltages V_V$_0$-V_V$_{N-1}$, and the values of the first through fourth cell temperatures T_VAL$_0$-T_VAL$_{N-1}$, from the memory 1618. The cell modelling device 1608 includes suitable circuitry for determining various parameters such as first through fourth states-of-health (SOHs), the first through fourth SOCs, charging rates, discharging rates, and the like corresponding to each of the first through fourth cells 804a-804d. The cell modelling device 1608 further determines a weakest cell in the multi-source ESS 100. A weak cell has a lower capacity compared to other cells. This causes the weak cell to discharge at a rate that is quicker as compared to cells that discharge at an expected rate. It will be apparent to a person skilled in the art that there can be multiple weak cells in the multi-source ESS 100.

The cost calculation and prediction device 1614 determines a cost of the power that is required to charging the multi-source ESS 100 based on the various parameters such as the first through fourth cell SOHs, first through fourth SOCs, the charging rate, the discharging rate, and the like corresponding to each of the first through fourth cells 804a-804d. The cost calculation and prediction device 1614 further determines optimum operation conditions for the multi-source ESS 100 such that the cost of the power used for charging the multi-source ESS 100 is minimum and the price of power supplied to the electric grid (not shown) is the maximum. Further, the cost calculation and prediction device 1614 generates a cost curve of the multi-source ESS 100 based on charging and discharging profiles of the first through fourth cells 804a-804d.

The load forecasting device 1616 determines a future requirement of the power needed to be supplied by the multi-source ESS 100 to the load (not shown) based on historical load data and predicted weather data. Further the load forecasting device 1616 generates an hour-ahead and a day-ahead value of power requirement from the multi-source ESS 100. The load forecasting device 1616 further communicates with the cell modelling device 1608 to determine an optimal hour-ahead and an optimal day-ahead values to minimize degradation of the first through fourth cells 804a-804d.

Figure 17:
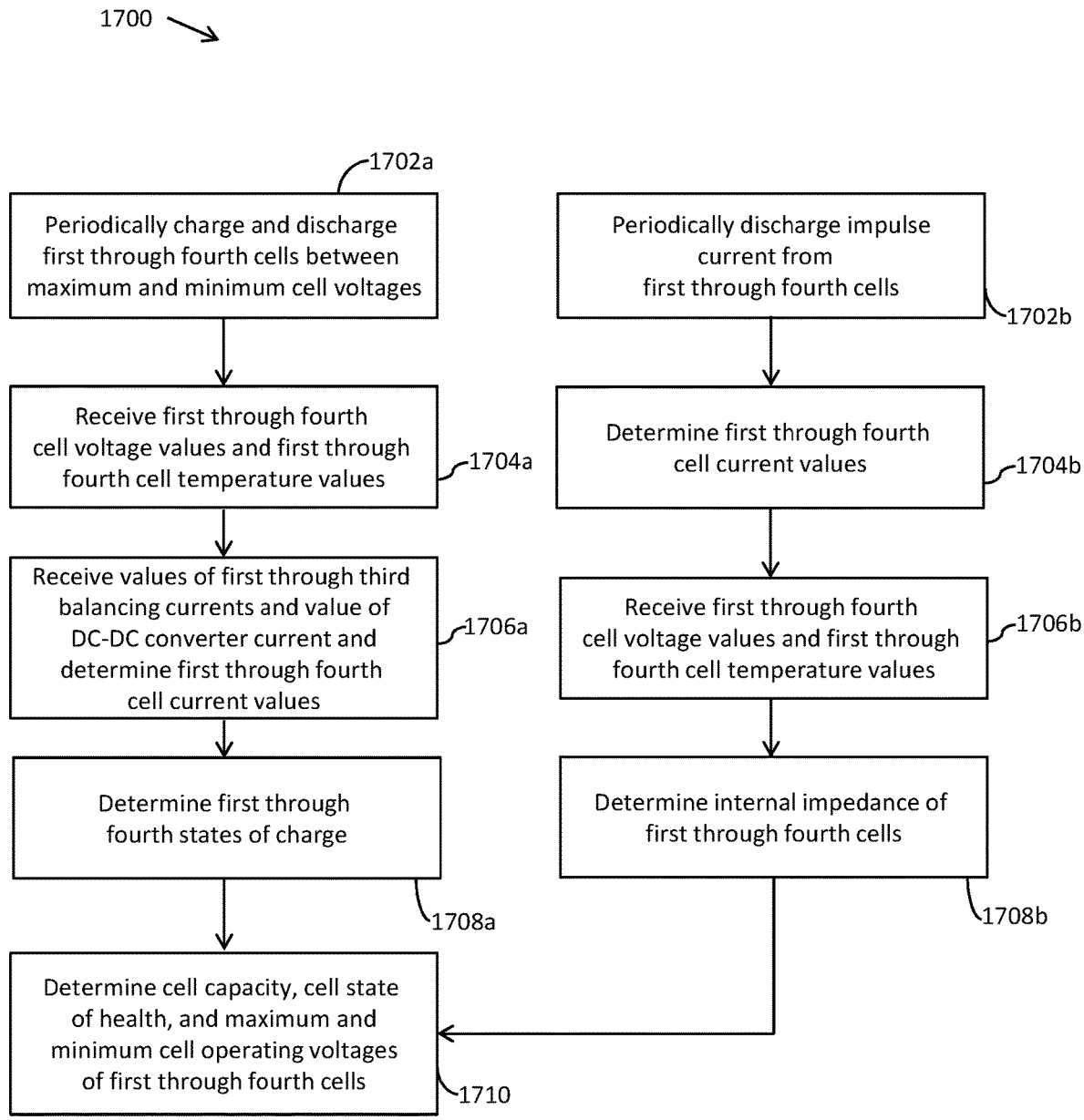
FIG. 17 is a flowchart illustrating a method for determining a cell capacity, a cell state-of-health (SOH), a maximum operating voltage, and a cell minimum voltage for first through fourth cells of the first nano-ESS of FIG. 8, in accordance with an embodiment of the present invention.

Referring now to FIG. 17, a flow chart 1700 illustrating a method for determining the cell capacity, the cell SOH, the cell maximum operating voltage, and the cell minimum operating voltage for the first through fourth cells 804a-804d of FIG. 8, in accordance with an embodiment of the present invention is shown. At step 1702a, the ESS controller 202 selects the first nano-ESS 404a based on the micro-ESS synchronization-control signal MESS$_{SYNCTRL}$ and periodically charges and discharges each of the first through fourth cells 804a-804d between a maximum cell rated voltage and a minimum cell rated voltage of first through fourth cells 804a-804d. The maximum and minimum cell rated voltages of the first through fourth cells are predetermined by a manufacturer of the first through fourth cells 804a-804d. The ESS controller 202 periodically charges and discharges the first nano-ESS 404a, while the second through ninth nano-ESS 404b-404i generate the second through ninth nano-ESS voltages $V_{NESS12}$-$V_{NESSMN}$. The first ESS 104a simultaneously operates to generate the first ESS voltage $V_{ESS1}$ and the first ESS current $I_{ESS1}$. Further, the ESS controller 202 charges and discharges each of the first through fourth cells 804a-804d at predetermined charging and discharging rates, respectively. The second through fifth voltage sensors 812a-812d simultaneously measure the first through fourth cell voltages $V_{CELL0}$-$V_{CELLN-1}$. Similarly, the first through fourth temperature sensors 814a-814d simultaneously measure the first through fourth cell temperature values $T\_VAL_0$-$T\_VAL_{N-1}$. At step 1704a, the ESS controller 202 receives the values of the first through fourth cell voltages $V\_V_0$-$V\_V_{N-1}$ from the second through fifth voltage sensors 812a-812d. The ESS controller 202 further receives the values of the first through fourth cell temperature $T\_VAL_0$-$T\_VAL_{N-1}$ from the first through fourth temperature sensors 814a-814d. At step 1706a, the ESS controller 202 receives the values of the first through third balancing currents $I\_VAL_1$-$I\_VAL_{N-1}$ and the value of the bidirectional DC-DC converter current $I\_VAL_N$, respectively, from the third through sixth current sensors 810a-810d. The ESS controller 202 determines the first through fourth cell currents $I_{CELL0}$-$I_{CELLN-1}$ based on the values of the first through third balancing currents $I\_VAL_1$-$I\_VAL_{N-1}$ and the value of bidirectional DC-DC converter current $I\_VAL_N$. At step 1708a, the ESS controller 202 determines the first through fourth SOCs based on the first through fourth cell currents $I_{CELL0}$-$I_{CELLN-1}$, the values of the first through fourth voltages $V\_V_0$-$V\_V_{N-1}$, and the values of first through fourth cell temperatures $T\_VAL_0$-$T\_VAL_{N-1}$.

At step 1702b, the ESS controller 202 periodically discharges an impulse current through first through fourth cells 804a-804d by way of the bidirectional DC-DC converter 808. At step 1704b, the ESS controller 202 determines a value of a cell impulse current based on the value of the bidirectional DC-DC converter current $I\_VAL_N$. The first through third cell balancing converters 806a-806c are switched off when the cell impulse current is discharged through the first through fourth cells 804a-804d, respectively. At step 1706b, the ESS controller 202 measures first through fourth cell transient cell voltage values of the first through fourth cells 804a-804d and the values of first through fourth cell temperatures $T\_VAL_0$-$T\_VAL_{N-1}$ during and after the impulse current is discharged through the first through fourth cells 804a-804d. At step 1708b, the ESS controller 202 determines the first through fourth internal impedances of the first through fourth cells 804a-804d, respectively, based on the value of the impulse current, values of the first through fourth transient cell voltages, and the values of first through fourth cell temperatures $T\_VAL_0$-$T\_VAL_{N-1}$.

At step 1710, the ESS controller 202 determines first through fourth capacity values of the first through fourth cells 804a-804d based on the values first through fourth SOCs of the first through fourth cells 804a-804d, respectively. The ESS controller 202 further determines the first through fourth SOHs of first through fourth cells 804a-804d, respectively, by way of cell capacity measurements, differential capacity measurements, and cell impedance measurements of the first through fourth cells 804a-804d. The ESS controller 202 stores the values of first through fourth cell capacities, first through fourth cell impedances and differential capacity measurement results of the first through fourth cells 804a-804d, respectively, in the ESS memory 214. Further, the ESS controller 202 determines the cell maximum and the cell minimum operating voltage of the first through fourth cells 804a-804d. The ESS controller 202 further determines the minimum and maximum operating voltages of the first through fourth cells 804a-804d based on the first through fourth cell SOHs periodically after a predetermined time period. The predetermined time period may typically range from a few weeks to a few months.

Figure 18:
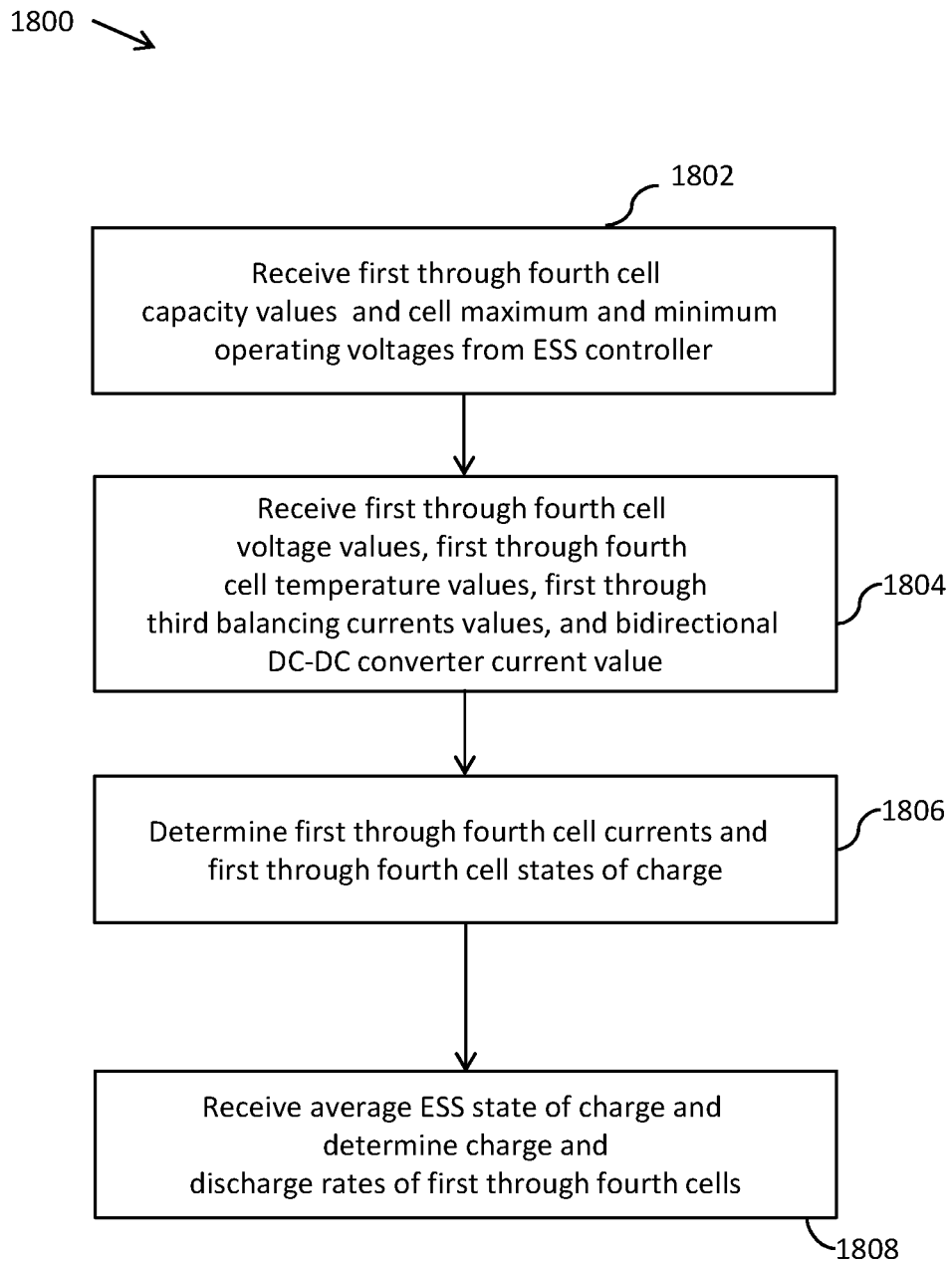
FIG. 18 is a flowchart illustrating a method for determining charge and discharge rates of the first through fourth cells of the first nano-ESS of FIG. 8, in accordance with an embodiment of the present invention.

Referring now to FIG. 18, a flowchart 1800 illustrating a method for determining charge and discharge rates of the first through fourth cells 804a-804d, in accordance with an embodiment of the present invention is shown. At step 1802, the nano-ESS controller 802 receives the first through fourth cell capacity values, the maximum cell operating voltage, and the minimum cell operating voltage of the first through fourth cells 804a-804d from the ESS controller 202. Determination of the first through fourth cell capacity values and first through fourth cell maximum and minimum operating voltages has been explained in conjunction with FIG. 17. The nano-ESS controller 802 periodically updates the maximum cell operating voltage and the minimum cell operating voltage of each of the first through fourth cells 804a-804d. At step 1804, the nano-ESS controller 802 receives the values of the first through fourth cell voltages $V\_V_0$-$V\_V_{N-1}$ from the second through fifth voltage sensors 812a-812d. The nano-ESS controller 802 further receives the values of the first through fourth cell temperatures $T\_VAL_0$-$T\_VAL_{N-1}$ from the first through fourth temperature sensors 814a-814d, respectively. At step 1806, the nano-ESS controller 802 receives the values of first through third balancing currents $I\_VAL_1$-$I\_VAL_{N-1}$ from the third through fifth current sensors 810a-810c, respectively, and the value of DC-DC converter current $I\_VAL_N$ from the sixth current sensor 810d. The nano-ESS controller 202 determines the first through fourth cell currents $I_{CELL0}$-$I_{CELLN-1}$ based on the values of the first through third balancing currents $I\_VAL_1$-$I\_VAL_{N-1}$ and the value of bidirectional DC-DC converter current $I\_VAL_N$. The nano-ESS controller 802 further determines the values of first through fourth SOCs based on the values of the first through third balancing currents $I\_VAL_1$-$I\_VAL_{N-1}$, the value of bidirectional DC-DC converter current $I\_VAL_N$, the values of the first through fourth cell voltages $V\_V_0$-$V\_V_{N-1}$, and the values of the first through fourth cell temperatures $T\_VAL_1$-$T\_VAL_{N-1}$. At step 1808, the nano-ESS controller 802 further receives a value of average SOC from the ESS controller 202 and determines the charge rate, and the discharge rate of the first though fourth cells 804a-804d. The nano-ESS controller 802 further adjusts the first through third balancing currents $I_{BAL1}$-$I_{BALN-1}$, and the bidirectional DC-DC converter current $I_{DC-DC}$ based on the charge rate, and the discharge rate of the first though fourth cells 804a-804d.

The multi-source ESS 100 facilitates addition of the new micro-ESS 302, and the first and second new nano-ESSs 502 and 504 in the multi-source ESS 100. Further, the new micro-ESS 302 may have a different power rating from the first through third micro-ESSs 204a-204c. Similarly, the first and second new nano-ESSs 502 and 504 may have a different power rating from the first through ninth nano-ESSs 404a-404i. The first ESS 104a allows for a plug and play replacement or augmentation of degraded micro-ESSs from the array of micro-ESSs 204, and degraded nano-ESSs from the array of nano-ESSs 404. This saves time for the users, and also prevents monetary loss thereto. Further, the ability to add the new micro-ESS 302, and the first and second new nano-ESSs 502 and 504 to the multi-source ESS 100 facilitates the users to replace the degraded micro-ESSs and the degraded nano-ESSs, while retaining the remaining micro-ESSs and nano-ESSs. Further, the ability to add the new micro-ESS 302, and the first and second new nano-ESSs 502 and 504 to the multi-source ESS 100 allows for increasing the capacity of the multi-source ESS 100 depending on the power requirements of the load (not shown).

Each of the array of cell balancing converters 806 has a lower power rating as compared to the bidirectional DC-DC converter 808. This facilitates a higher operating efficiency of the multi-source ESS 100, as well as a lower operation cost of the multi-source ESS 100. Further, the array of cell balancing converters 806 balance charges in each of the first through fourth cells 804a-804d by adjusting the charge and discharge rates of each of the first through fourth cells 804a-804d. The PWM 406 thus facilitates the first micro-ESS 404a to generate the micro-ESS voltage $V_{MESS1}$ as an AC voltage as well as a DC voltage. This is advantageous as the multi-source ESS 100 may be used for powering loads of various ratings. Since the first nano-ESS 404a employs the array of cell balancing converters 806 and the bidirectional DC-DC converter 808, which allows for the first through fourth cells 804a-804d to be mismatched. Further the first through fourth cells 804a-804d do not need to be matched to the cells of the second nano-ESS 404b.

The first through fourth cells 804a-804d may provide one of a high energy density and a high power density. This facilitates the first nano-ESS 404a to provide the high energy density and the second nano-ESS 404b to provide the high power density simultaneously. Hence, each of the first through ninth nano-ESSs 404a-404i can be configured for generating the array total voltage $V_{PWM}$ at one of high energy density and high power density. Further, since the first through ninth nano-ESSs 404a-404i can be bypassed, the first through sixth current sensors 210, 408, and 810a-810d, and the second through fifth voltage sensors 812a-812d facilitate measurement of the first through fourth cell voltages $V_{CELL0}$-$V_{CELLN-1}$ and first through fourth cell currents $I_{CELL0}$-$I_{CELLN-1}$ for determining the first through fourth SOCs, the first through fourth cell SOHs, and the first through fourth cell impedances without stopping the operation of the multi-source ESS 100. Further, since each of the first through ninth nano-ESSs 404a-404i operate in one of the blocking mode, the bypass mode, and the normal mode, the operation of one or more of the first through ninth nano-ESSs 404a-404i can be blocked if the one or more of the first through ninth nano-ESSs 404a-404i start operating sub-optimally. This facilitates a lower operation cost of the multi-source ESS 100 and extends operation life of each of the first through fourth cells 804a-804d.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An energy storage system (ESS) for generating an ESS voltage and an ESS current, the ESS comprising:
   a plurality of micro-ESSs, that are connected in series, for generating corresponding plurality of micro-ESS voltages, wherein each micro-ESS is a small subset of the ESS, and wherein a first micro-ESS of the plurality of micro-ESSs generates a first micro-ESS voltage of the plurality of micro-ESS voltages and the ESS current, and wherein the ESS voltage is a sum of the plurality of micro-ESS voltages, and wherein the first micro-ESS comprises:
   a plurality of nano-ESSs, that generate corresponding plurality of nano-ESS voltages and currents, and an array total voltage and an array total current based on the plurality of nano-ESS voltages and currents, respectively, wherein each nano-ESS is a small subset of the first micro-ESS, and wherein a first nano-ESS of the plurality of nano-ESSs comprises:
   a plurality of cells, connected in series, for generating corresponding plurality of cell voltages as an input voltage and corresponding plurality of cell currents as an input current,
   wherein the first nano-ESS generates a first nano-ESS voltage of the plurality of nano-ESS voltages and a first nano-ESS current based on the input voltage and the input current, respectively, and wherein the first micro-ESS generates the first micro-ESS voltage and the ESS current based on the array total voltage and the array total current and
   an ESS controller, connected to the plurality of micro-ESSs, that generates a micro-ESS synchronization-control signal by encoding a micro-ESS synchronization signal with a micro-ESS control signal, and transmits the micro-ESS synchronization-control signal to each micro-ESS of the plurality of micro-ESSs, wherein the first micro-ESS generates the first micro-ESS voltage and the ESS current based on the micro-ESS synchronization-control signal.

2. The ESS of claim 1, where the plurality of nano-ESSs are connected in at least one of a series combination and a parallel combination.

3. The ESS of claim 1, wherein the first micro-ESS further includes:
   a micro-ESS controller that is connected to the ESS controller and receives the micro-ESS synchronization-control signal, and generates a nano-ESS synchronization-control signal, a plurality of nano-ESS communication signals, and a plurality of pulse width modulator (PWM) control signals; and
   a PWM that is connected to the plurality of nano-ESSs for receiving the array total voltage and the array total current, and the micro-ESS controller for receiving the plurality of PWM control signals, and generates the first micro-ESS voltage, and the ESS current.

4. The ESS of claim 3, wherein the first micro-ESS further includes a first capacitor connected across the plurality of nano-ESSs, wherein the first capacitor charges and discharges based on a difference between the array total current and the ESS current, thereby stabilizing the array total voltage.

5. The ESS of claim 3, wherein the first nano-ESS further includes a nano-ESS controller connected to the micro-ESS controller for receiving the nano-ESS synchronization-control signal, and generating a plurality of balancing control signals and a plurality of power control signals.

6. The ESS of claim 5, wherein the first nano-ESS further includes:
a plurality of cell balancing converters, connected to the plurality of cells, for generating corresponding plurality of balancing currents, wherein a first cell balancing converter of the plurality of cell balancing converters receives the plurality of balancing control signals, and generates a first balancing current of the plurality of balancing currents; and
a bidirectional direct current (DC)-DC converter, connected across the plurality of cells and to the nano-ESS controller, that receives the input voltage and the plurality of power control signals, and generates the first nano-ESS voltage and the first nano-ESS current.

7. The ESS of claim 6, further comprising:
a first bidirectional communication bus that connects the plurality of micro-ESSs to the ESS controller, transmits a plurality of micro-ESS communication signals from the ESS controller to the plurality of micro-ESSs, and transmits a plurality of micro-ESS communication signals from the plurality of micro-ESSs to the ESS controller; and
a second bidirectional communication bus that connects the plurality of nano-ESSs to the micro-ESS controller, transmits the plurality of nano-ESS communication signals from the micro-ESS controller to the plurality of nano-ESSs, and transmits the plurality of nano-ESS communication signals from the plurality of nano-ESSs to the micro-ESS controller.

8. The ESS of claim 7, wherein the ESS controller is configured to:
bypass one or more micro-ESSs of the plurality of micro-ESS and one or more nano-ESSs of the plurality of nano-ESSs based on a plurality of operation parameters of the plurality of micro-ESSs and the plurality of nano-ESSs,
determine if a second micro-ESS of the plurality of micro-ESSs and a second nano-ESS of the plurality of nano-ESSs have been removed from the ESS,
determine if a new micro-ESS and a new nano-ESS have been added to the ESS, and
adjust the ESS current, the plurality of nano-ESS currents, the plurality of micro-ESS voltages, the plurality of nano-ESS voltages, a first phase difference between each of the plurality of micro-ESS voltages, and a second phase difference between each of the plurality of nano-ESS voltages and the plurality of nano-ESS currents.

9. The ESS of claim 1, wherein the ESS controller further comprises a memory for storing a plurality of cell operation parameters corresponding to each cell of a plurality of cells, wherein the plurality of cell operation parameters include a cell voltage and a cell temperature, a cell current, a state-of-charge (SOC), and a state-of-health (SOH).

10. The ESS of claim 1, further comprising:
a current sensor, connected in series with the plurality of micro-ESSs for measuring the ESS current and generating an ESS current value; and
a resistive network, connected across the plurality of micro-ESSs for measuring the ESS voltage and generating an ESS voltage value, wherein an ESS controller of the ESS determines a value of a first error in the ESS current and a value of a second error in the ESS voltage based on the ESS current value and the ESS voltage value, respectively, and wherein the ESS controller transmits the values of the first and second errors to each micro-ESS of the plurality of micro-ESSs.

11. The ESS of claim 1, wherein each of the plurality of micro-ESS voltages is one of a pulse width modulated sinusoidal voltage, a pulse width modulated DC voltage, and a pulse width modulated rectified sinusoidal voltage.

12. The ESS of claim 1, wherein the ESS comprises a multi-phase ESS.

13. The ESS of claim 1, further comprising:
a solar photovoltaic array, connected to the ESS by way of a common voltage bus; and
a photovoltaic inverter that is connected to the solar photovoltaic array and the ESS, wherein the photovoltaic inverter performs maximum power point tracking (MPPT) on the solar photovoltaic array, wherein the ESS maintains a constant power across output terminals thereof when the photovoltaic inverter performs MPPT on the solar photovoltaic array, and wherein the ESS and the solar photovoltaic array are connected to an electric grid by way of the photovoltaic inverter.

14. The ESS of claim 13, wherein the ESS and the solar photovoltaic array are connected to the electric grid, and wherein the ESS performs one of drawing power from the electric grid and supplying power to the electric grid.

15. The ESS of claim 1, wherein the ESS is connected to a motor of one of an electric vehicle and a hybrid-electric vehicle, for powering the motor.

16. A micro-energy storage system (ESS), wherein the micro-ESS is a small subset of an ESS, and wherein the micro ESS comprises:
a plurality of nano-ESSs that are connected in at least one of a series combination and a parallel combination, and generate an array total voltage and an array total current, wherein each nano-ESS is a small subset of the micro-ESS;
a micro-ESS controller, connected to the plurality of nano-ESSs, that generates a nano-ESS synchronization-control signal by encoding a nano-ESS control signal with a nano-ESS synchronization signal, a plurality of nano-ESS communication signals, and a plurality of pulse width modulator (PWM) control signals; and
a PWM, that is connected across the plurality of nano-ESSs and to the micro-ESS controller, that receives the plurality of PWM control signals, the array total voltage, and the array total current, and generates a first micro-ESS voltage and a first micro-ESS current.

17. The micro-ESS of claim 16, wherein a first nano-ESS of the plurality of nano-ESSs includes a nano-ESS controller that receives the nano-ESS synchronization-control signal, and generates a plurality of balancing control signals and a plurality of power control signals.

18. The micro-ESS of claim 17, wherein the first nano-ESS further includes:
a plurality of cells connected in series for generating an input voltage, wherein a first cell of the plurality of cells generates a first cell voltage of a plurality of cell voltages;
a plurality of cell balancing converters, connected to the plurality of cells, for generating corresponding plurality of balancing currents, wherein a first cell balancing converter of the plurality of cell balancing converters receives the plurality of balancing control signals, and generates a first balancing current of the plurality of balancing currents; and a bidirectional direct current (DC)-DC converter, connected across the plurality of cells and to the nano-ESS controller, that receives the input voltage and the plurality of power control signals, and generates a first nano-ESS voltage and a first nano-ESS current.

19. A method for determining a state-of-health (SOH) of a plurality of cells of an energy storage system (ESS) by an ESS controller of the ESS, wherein the ESS includes a plurality of micro-ESSs, and wherein each micro-ESS is a small subset of the ESS, and wherein each micro-ESS includes a plurality of nano-ESSs, the method comprising:

selecting a first nano-ESS of the plurality of nano-ESSs based on a micro-ESS synchronization-control signal, wherein the first nano-ESS includes the plurality of cells, and wherein an ESS controller of the ESS generates the micro-ESS synchronization-control signal, and wherein the first nano-ESS is a small subset of a first micro-ESS of the plurality of micro-ESSs;

determining a plurality of cell current values, a plurality of cell state-of-charge (SOC) values, a plurality of cell voltage values, and a plurality of cell capacity values corresponding to the plurality of cells;

determining a plurality of cell impedance values corresponding to the plurality of cells; and determining a plurality of cell SOH values, values of maximum operating cell voltages, and values of minimum operating cell voltages corresponding to the plurality of cells, wherein the plurality of cell SOH values represent the SOH of the plurality of cells, wherein the ESS controller periodically updates the values of the maximum and minimum cell operating voltages.

20. The method of claim 19, further comprising:

charging the plurality of cells from a minimum cell rated voltage to a maximum cell rated voltage; and discharging the plurality of cells from the maximum cell rated voltage to the minimum cell rated voltage.

21. The method of claim 19, further comprising:

receiving a plurality of balancing current values and a bidirectional DC-DC converter current value from a plurality of balancing current sensors and a bidirectional DC-DC converter current sensor, respectively;

receiving the plurality of cell voltage values from a plurality of voltage sensors connected across the plurality of cells; and receiving a plurality of temperature values from a plurality of temperature sensors connected to the plurality of cells.

22. A method for estimating a plurality of charging rates and a plurality of discharging rates corresponding to a plurality of cells of an Energy Storage System (ESS) by a nano ESS controller of a first nano-ESS of a plurality of nano-ESSs of the ESS, wherein the ESS includes a plurality of micro-ESSs, and wherein a first micro-ESS of the plurality of micro-ESS is a small subset of the ESS, and wherein the first nano-ESS is a small subset of the first micro-ESS, the method comprising:

determining a plurality of cell current values based on a plurality of balancing current values and a bidirectional DC-DC converter current value, wherein the first nano-ESS includes the plurality of cells;

determining a plurality of state-of-charge (SOC) values corresponding to the plurality of cells based on the plurality of cell current values, a plurality of cell voltage values of the plurality of cells, and a plurality of cell temperature values of the plurality of cells;

receiving an average SOC value from an ESS controller of the ESS, wherein the average SOC value is an average of the plurality of SOC values; and determining the plurality of charging rates and the plurality of discharging rates, corresponding to the plurality of cells based on the plurality of SOC values.

23. The method of claim 22, further comprising:

receiving a plurality of cell capacity values, values of cell maximum operating voltage, and values of cell minimum operating voltage corresponding to the plurality of cells from a second controller;

receiving the plurality of cell voltage values and a plurality of cell temperature values corresponding to the plurality of cells; and receiving the plurality of balancing current values and the bidirectional DC-DC converter current value from a plurality of current sensors.

* * * * *